US009690771B2

(12) United States Patent
Tremblay et al.

(10) Patent No.: US 9,690,771 B2
(45) Date of Patent: Jun. 27, 2017

(54) AUTOMATED QUALITY ASSURANCE CHECKS FOR IMPROVING THE CONSTRUCTION OF NATURAL LANGUAGE UNDERSTANDING SYSTEMS

(71) Applicant: Nuance Communications, Inc., Burlington, MA (US)

(72) Inventors: Real Tremblay, Outremont (CA); Jerome Tremblay, Montreal (CA); Serge Robillard, Lachine (CA); Jackson Liscombe, Hudson, NY (US); Alina Andreevskaia, Montreal (CA); Tagyoung Chung, Sunnyvale, CA (US)

(73) Assignee: Nuance Communications, Inc., Burlington, MA (US)

( * ) Notice: Subject to any disclaimer, the term of this patent is extended or adjusted under 35 U.S.C. 154(b) by 343 days.

(21) Appl. No.: 14/453,305

(22) Filed: Aug. 6, 2014

(65) Prior Publication Data

US 2015/0347375 A1      Dec. 3, 2015

Related U.S. Application Data

(60) Provisional application No. 62/005,709, filed on May 30, 2014.

(51) Int. Cl.
*G06F 17/27*        (2006.01)
*G06F 17/30*        (2006.01)

(52) U.S. Cl.
CPC ......... *G06F 17/271* (2013.01); *G06F 17/277* (2013.01); *G06F 17/30734* (2013.01)

(58) Field of Classification Search
CPC ............ G06F 17/2277; G06F 17/2775; G06F 17/278; G06F 17/2785; G06F 17/271; G06F 17/277; G06F 17/30734
See application file for complete search history.

(56) References Cited

U.S. PATENT DOCUMENTS 8,515,736 B1     8/2013   Duta
2003/0217052 A1 *  11/2003 Rubenczyk ....... G06F 17/30643
(Continued)

FOREIGN PATENT DOCUMENTS

CA    WO 2007118324 A1 * 10/2007 ............. G10L 15/06

*Primary Examiner* — Scott Baderman
*Assistant Examiner* — Seung Jung
(74) *Attorney, Agent, or Firm* — Banner & Witcoff, Ltd.

(57) ABSTRACT

Aspects described herein provide quality assurance checks for improving the construction of natural language understanding grammars. An annotation module may obtain a set of annotations for a set of text samples based, at least in part, on an ontology and a grammar. A quality assurance module may automatically perform one or more quality assurance checks on the set of annotations, the ontology, the grammar, or combinations thereof. The quality assurance module may generate a list of flagged annotations during performance of a quality assurance check. The list of flagged annotations may be presented at an annotation review interface displayed at a display device. One of the flagged annotations may be selected and presented at an annotation interface displayed at the display device. Responsive to presentation of the flagged annotation, the ontology, the grammar, the flagged annotation selected, or combinations thereof may be updated based on user input received.

17 Claims, 14 Drawing Sheets

(56) References Cited

U.S. PATENT DOCUMENTS

2007/0179776 A1\* 8/2007 Segond .............. G06F 17/2247
 704/9
2009/0204596 A1\* 8/2009 Brun .................... G06F 17/278
2013/0086059 A1 4/2013 Balchandran et al.
2014/0379666 A1\* 12/2014 Byron .............. G06F 17/30371
 707/687

\* cited by examiner

AUTOMATED QUALITY ASSURANCE CHECKS FOR IMPROVING THE CONSTRUCTION OF NATURAL LANGUAGE UNDERSTANDING SYSTEMS

CROSS-REFERENCE TO RELATED APPLICATION

This application claims the benefit of U.S. Provisional Patent Application No. 62/005,709 entitled "AUTOMATED QUALITY ASSURANCE CHECKS FOR IMPROVING THE CONSTRUCTION OF NATURAL LANGUAGE UNDERSTANDING SYSTEMS" and filed on May 30, 2014 which is incorporated by reference herein in its entirety.

Incoporation by Reference

This application is related to commonly-owned U.S. patent application Ser. No. 14/188,206 to Rachevsky et al. entitled "Automated Text Annotation for Construction of Natural Language Understanding Grammars" and filed on Feb. 24, 2014, which is incorporated by reference in its entirety herein.

This application also incorporates by reference the entirety of commonly-owned U.S. patent application Ser. No. 13/941,783 entitled "Ontology and Annotation Driven Grammar Interface" filed on Jul. 15, 2013 and commonly-owned U.S. Pat. No. 8,515,736 to Duta entitled "Training Call Routing Applications by Reusing Semantically-Labeled Data Collected for Prior Applications" which issued on Aug. 20, 2013.

BACKGROUND

Building speech recognition applications can be a time consuming process. Development of natural language understanding (NLU) systems, in particular, can be one of the most challenging aspects of developing speech applications. Such development may involve the use of special linguistic and software development skills. Development of natural language understanding systems may also rely on grammars written manually and statistical models that are trained on large quantities of manually-annotated text. Manual annotations may be time-consuming and error-prone that can increase development time and affect the quality of the grammars and statistical models produced.

Various approaches to enhance the development of grammars and statistical models have been attempted. With respect to grammar development, for example, some conventional approaches might utilize unsupervised grammar induction techniques, integrated development environments (IDEs) for authoring grammars, or graphical user interface, i.e., GUI-based interactive tools as alternatives to manual grammar creation.

Unsupervised grammar induction techniques, however, do not provide meaningful grammar rules that are readable to humans and also require further manual tuning Although IDEs may be useful in testing grammars, debugging grammars, and visualizing parsing results, such IDEs do not provide suggestions regarding the target grammar structure, grammar rules, or the ordering of such rules. Instead IDEs delegate these tasks to the user. While GUI-based interactive tools may be helpful in guiding a user through an annotation process, such tools use complicated statistical and lexicalization models (e.g., hidden Markov models and context-free grammars). As a result, such GUI-based tools require significant amounts of effort to properly define slot fillers based on regular expressions.

Improved approaches to developing natural language understanding systems and annotating text samples have been described. The disclosures set forth in further detail below describe additional improvements to the development of natural language understanding system and text annotation processes.

SUMMARY

The following presents a simplified summary in order to provide a basic understanding of some aspects of the disclosure. The summary is not an extensive overview of the disclosure and is not intended to identify key or critical elements or to delineate the scope of protection sought. The following summary merely presents some concepts of the disclosure in a simplified form as an introduction to the more detailed description provided below.

A first aspect described herein provides a method for improving the text annotation process. An annotation module may obtain a set of annotations for a set of text samples based, at least in part, on an ontology and a grammar. A quality assurance module may automatically perform one or more quality assurance checks on the set of annotations, the ontology, the grammar, or combinations thereof. The quality assurance module may generate a list of flagged annotations during performance of a quality assurance check. The list of flagged annotations may be presented at an annotation review interface displayed at a display device.

A second aspect described herein provides a annotation system. The annotation system may include at least one processing unit, an annotation module, a quality assurance module, and an annotation review interface. The annotation module may be configured to, in operation, obtain a set of annotations for a set of text sample based, at least in part, on an ontology and a grammar. The quality assurance module may be configured to, in operation, perform one or more quality assurance checks on the set of annotations, the ontology, the grammar, and combinations thereof. The quality assurance module may also be configured to, in operation, generate a list of flagged annotations during performance of the one or more quality assurance checks. The annotation review interface may be configured to, in operation, present the list of flagged annotations at a display device.

A selection of one of the flagged annotations may be received at the annotation review interface and presented at an annotation interface displayed at the display device. Responsive to presentation of the flagged annotation selected, the ontology, the grammar, the flagged annotation selected, or combinations thereof may be updated based on user input received.

The list of flagged annotations may be grouped by type of quality assurance check.

Performing one of the quality assurance checks may include comparing an arrangement of a set of hypernyms of one annotation to another arrangement of a matching set of hypernyms of another annotation. If the arrangements of hypernyms do not match, then the list of flagged annotations may be configured to include those annotations.

Performing one of the quality assurance checks may include grouping a plurality of text samples to obtain a group of text samples. The respective hypernyms used to annotate each text sample of the group of text samples may be compared. If two of the text samples of the group of text samples have been annotated with a different hypernym— i.e., have not been annotated with a common hypernym—then the list of flagged annotations may be configured to include the annotations associated with those text samples. Semantic clustering techniques may be applied to the set of text samples in order to obtain the group of text samples. User input may be received corresponding to a selection of a hypernym selected for the group of text samples, and each annotation of a group of annotations for the group of text samples may be updated to include the hypernym selected.

Performing one of the quality assurance checks may include determining whether multiple grammar rules of the grammar can parse an n-gram. If multiple grammar rules of the grammar can parse the n-gram, then the list of flagged annotations may be configured to include one or more annotations that include the n-gram.

Performing one of the quality assurance checks may include determining whether the grammar is an acyclic grammar. If the grammar is not an acyclic grammar, then the list of flagged annotations may be configured to include one or more annotations that are associated with a cycle of the grammar.

Performing one of the quality assurance checks may include determining whether the set of annotations is consistent with the ontology. If an annotation is determined to be inconsistent with the ontology, then the list of flagged annotations may be configured to include the annotation. Determining that the annotation is inconsistent with the ontology may include determining that the annotation includes a hypernym that is not defined in the ontology or that the annotation includes a nested hierarchy of hypernym tags that does not conform to a relationship defined by the ontology.

Additional aspects will be appreciated with the benefit of the additional description provided in further detail below.

BRIEF DESCRIPTION OF THE DRAWINGS

The details of these and other embodiments of the disclosure are set forth in the accompanying drawings and description below. Other features and advantages of aspects of the disclosure will be apparent from the description and drawings.

DETAILED DESCRIPTION

Figure 1:
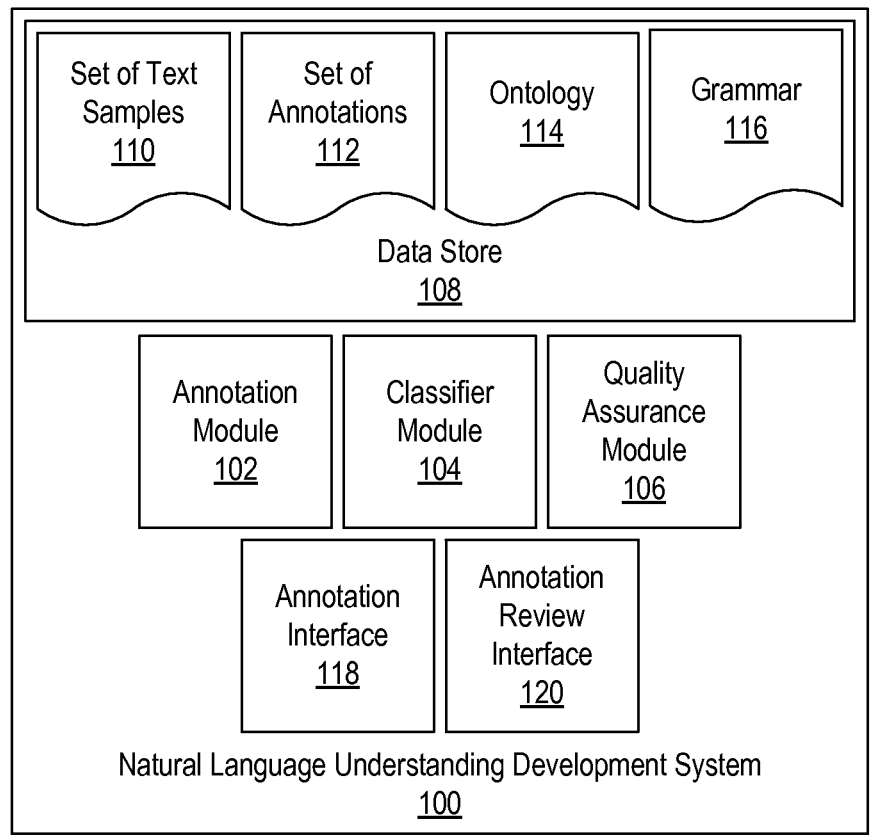
FIG. 1 is an example of an implementation of a natural language understanding development system according to illustrative aspects described herein.

Commonly-owned U.S. patent application Ser. No. 14/188,206 to Rachevsky et al., incorporated by reference, describes various approaches to automating aspects of the grammar construction process when constructing a natural language understanding grammar for speech applications. As described in that application, the grammar construction process may include annotating a set of text samples in order to train a classifier used to automatically annotate textual representations of speech audio. The present disclosure extends the teachings of that application by providing various improvements to the text annotation process. The various improvements to the text annotation process are described in further detail below. The improvements enhance the text annotation process by improving the suggested annotations, by grouping text samples using semantic clustering and suggesting annotations for the group, and by providing automated quality assurance checks to ensure consistency among the annotations. These and additional advantages will be appreciated with the benefit of the disclosures set forth in further detail below.

As aspects of the present disclosure are directed toward natural language understanding, the following terminology is adopted in the present disclosure for the purposes of convenience. A text sample refers to a string of one or more words. A substring refers to one or more consecutive words of a string in which the order of the words is preserved. One or more words of a text sample may be hyponyms (relatively low-level concepts) that correspond to or are otherwise associated with one or more hypernyms (relatively high-level concepts). An ontology may define a semantic relationship between hyponyms and hypernyms. A hyponym may be a single word of a text sample or multiple consecutive words of a text sample. It will be appreciated that a hypernym may, in some instances, be a hyponym of another hypernym. As an example, "Chicago" may be a hyponym of the hypernym "CITY," which may in turn be a hyponym of the hypernym "LOCATION." Additional examples will be appreciated with the benefit of this disclosure.

An annotation refers to a text sample in which an n-gram has been replaced by or tagged with a hypernym associated with the n-gram. An annotation may include multiple hypernyms that have respectively replaced or tagged multiple n-grams. An n-gram refers to a substring of text sample or an annotation having n consecutive words (for a text sample) or n consecutive words and/or hypernyms (for an annotation). Accordingly, a 1-gram may refer to a substring of text sample having one word of the text sample, or may refer to a substring of an annotation having one word or hypernym of the annotation. Likewise a 2-gram may refer to a substring of a text sample having two consecutive words of the text sample or may refer to a substring of an annotation having two consecutive words, two consecutive hypernyms, or a consecutive word and hypernym of the annotation. Additional examples will be appreciated for 3-grams, 4-grams, and so forth.

When an annotation has been tagged with a hypernym, the annotation may be referred to as a tagged annotation. A tagged annotation is one in which an n-gram is wrapped in a hypernym tag. A hypernym tag may indicate the hypernym associated with the n-gram and include an opening tag (e.g., "[. . .]") positioned before the n-gram and a closing tag (e.g., "[/]") positioned after the n-gram in the tagged annotation. As an example, the text sample "fly to JFK" may result in the tagged annotation "fly to [AIRPORT] JFK [/]" in which the hypernym tag for the concept of "AIRPORT" wraps the 1-gram "JFK."

A tagged annotation may also include a nested hierarchy of hypernym tags in which one or more hypernym tags of a tagged annotation is wrapped by another hypernym tag that indicates a relatively higher-level and semantically-related concept. The ontology may be used to construct the nested hierarchy. As an example, the tagged annotation of "fly from [ARRIVAL_LOCATION] [LOCATION] [AIRPORT] JFK [/] [/] [/]" may be generated based on an ontology that defines the following semantic relationship of "ARRIVAL_LOCATION"→"LOCATION"→"AIRPORT."

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways. It is to be understood that the phraseology and terminology used herein are for the purpose of description and should not be regarded as limiting. Rather, the phrases and terms used herein are to be given their broadest interpretation and meaning The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging. In addition a set refers to a collection of one or more elements. Furthermore computer-readable media as used in this disclosure includes all non-transitory computer-readable media and excludes transitory computer readable media such as propagating signals.

Referring now to FIG. 1, an example of an implementation of a natural language understanding (NLU) development system 100 for annotating text samples, developing NLU systems, and performing NLU processing is shown. The NLU development system 100, in this example, includes an annotation module 102, a classifier module 104, a quality assurance module 106, and a data store 108. The data store 108, in this example, may store a set of text samples 110, a set of annotations 112, an ontology 114, and a grammar 116. As methods described herein include computer-implemented methods for automating aspects of the text annotation process, the set of text samples 110, set of annotations 112, ontology 114, and grammar 116 may be stored at a data store in a digital format. In other words, the ontology 114 may be a digital ontology, the text samples in the set of text samples 110 may be digital text samples, the annotations in the set of annotations 112 may be digital annotations, and the grammar 116 may be a digital grammar. The NLU development system 100 may also include an annotation interface 118 and an annotation review interface 120. The NLU development system 100 may receive user input via one or more of the interfaces such as the annotation interface 118 and the annotation review interface 120, e.g., to modify a text sample, an annotation, the ontology 114, the grammar 116, or other elements that maintain information utilized by the NLU development system. Each of these elements will be discussed in further detail below.

The NLU development system 100 may reside at a computing device such as a desktop or laptop computer. A user may thus access and utilize the NLU development system 100 through local operation of the computing device. The NLU development system 100 may additionally or alternatively be hosted by a computing device such as an application server. A user may thus additionally or alternatively access the NLU development system 100 through remote operation via a portal (e.g., a web portal).

The annotation module 102 may be configured to, in operation, annotate text samples and generate annotations for the text samples. The annotation module 102 may be configured to annotate text samples in an automatic fashion or, additionally or alternatively, in response to input received from a user, i.e., in a manual fashion. The annotation module 102 may cause text samples and annotation candidates to be presented to a user at an annotation interface such as annotation interface 118 displayed at a display device. Through the annotation interface 118, a user may provide user input via an input device (e.g., a keyboard or a pointing device such as a mouse), to confirm automatically selected annotations for a text sample or to manually select annotation candidates as the annotations for a text sample. The annotation module 102 may, for example, be configured to present the list of annotation candidates to a user (e.g., in a contextual menu) and allow the user to manually select one of the annotation candidates as the annotation for the text sample.

The annotation module 102 may be configured to generate a set of annotation candidates corresponding to possible annotations for a text sample. The set of annotation candidates may include one or more annotation candidates and may be referred to as a list of annotation candidates. The annotation module 102 may then automatically select one of the annotation candidates as the annotation for the text sample, e.g. the annotation candidate having the highest score and appearing at the top of the list. The user may then provide input to confirm the automatically selected annotation candidate or to manually select a different annotation candidate from the list of annotation candidates. The annotation module 102 may also be configured to, in operation, annotate portions of a text sample by generating annotations for individual n-grams of the text sample. The user may thus confirm an automatically selected annotation for an individual n-gram of the text sample or manually select a different annotation for the individual n-gram. The annotation module 102 may save annotations to the data store 108 as elements of the set of annotations 112. The set of annotations 112 may also be referred to as an annotation corpus.

Figure 2:
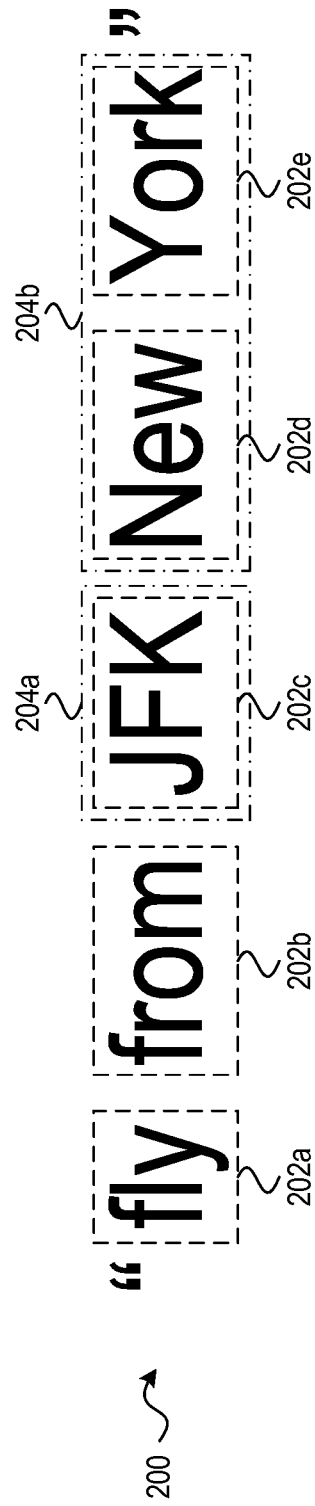
FIG. 2 is an illustration of an example text sample according to illustrative aspects described herein.

Referring briefly to FIG. 2, an illustration of an example text sample 200 is shown ("fly from JFK New York"). As noted above, the text sample 200 includes multiple individual words 202a-e. Individual words of the text sample 200 may thus correspond to respective 1-grams of the text sample. As seen in FIG. 2, some of the words such as word 202c ("JFK") and words 202d-e ("New York") correspond to hyponyms 204a and 204b respectively. As noted above, a hyponym such as hyponym 204b may comprise multiple words. The hyponym 204b in FIG. 2 consists of two words and thus corresponds to a 2-gram of the text sample 200. The words 202c and 202d-e represent respective hyponyms 204a-b in this example because these words may correspond to respective hypernyms, e.g., "AIRPORT" for "JFK" and "CITY" for "New York."

Figure 3:
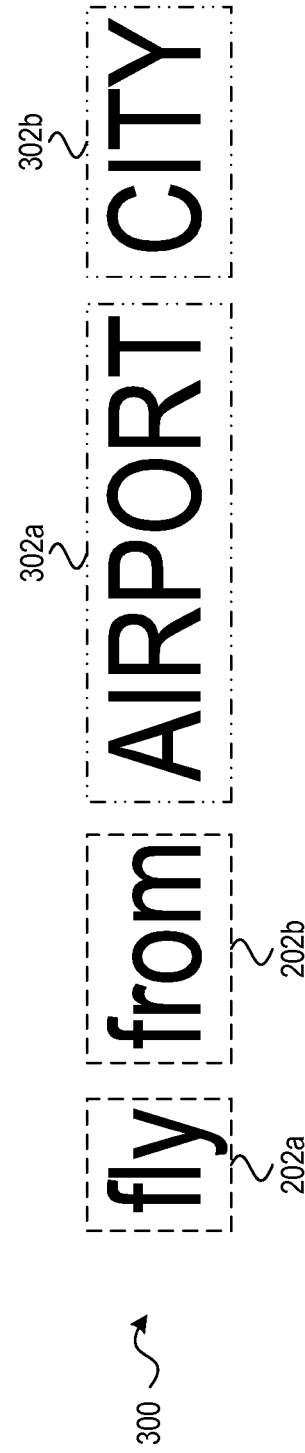
FIG. 3 is an illustration of an example annotation for the example text sample of FIG. 2 according to illustrative aspects described herein.

In FIG. 3 an illustration of an example annotation 300 of the text sample 200 of FIG. 2 is shown. As seen in the example annotation 300 of FIG. 3, the hyponyms 204a and 204b of the text sample 200 have been replaced with their corresponding hypernyms 302a and 302b. It will be appreciated that the annotation 300 illustrated in FIG. 3 is but one example of a possible annotation for the text sample 200 of FIG. 2. As noted above the annotation module 102 may generate a list of annotation candidates for a text sample or individual n-grams of the text sample, and a user may manually select one or more annotation candidates to annotate the text sample with.

Referring back to FIG. 1, the annotation module 102 may annotate multiple text samples from the set of text samples 110 during construction of a grammar such as grammar 116. Through the annotation of the set of text samples 110, the annotation module 102 may generate the set of annotations 112. The annotation module 102 may utilize, among other resources, the ontology 114 in order to annotate the text samples. The ontology 114 may be generally described as a collection of semantic relationship definitions that define semantic relationships between concepts. In some example implementations, the annotation module 102 may present at a display device information from the ontology 114. Based on the information presented at the display, a user may select a desired concept as the hypernym of an n-gram of a text sample during manual annotation of a text sample.

Figure 4:
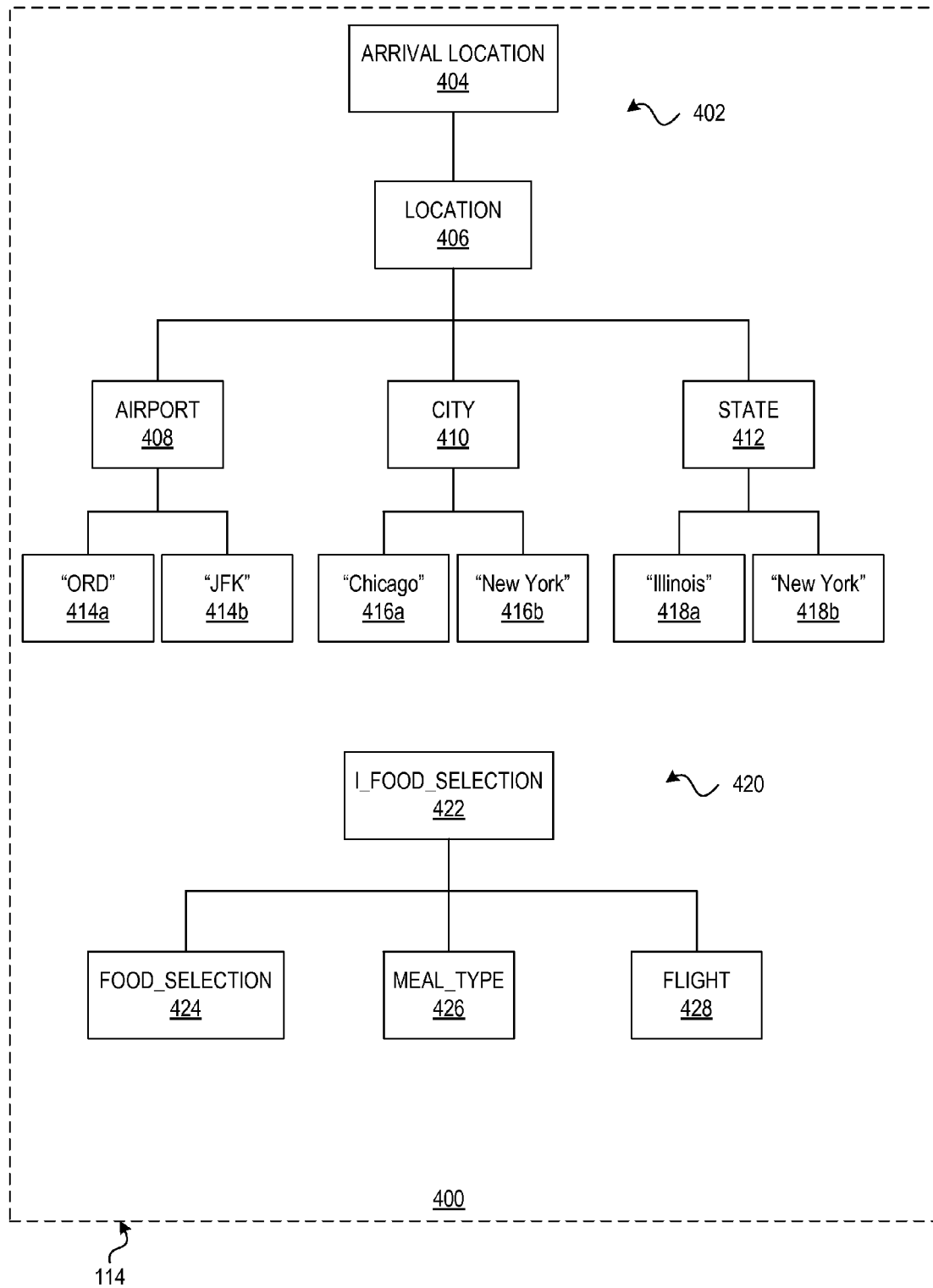
FIG. 4 is an illustration of a portion of an example ontology according to illustrative aspects described herein.

As noted above, the ontology 114 may define semantic relationships between concepts. The semantic relationships defined by the ontology may indicate that some concepts are hyponyms of other concepts and that some concepts are hypernyms of other concepts. With additional reference to FIG. 4, an illustration of a portion 400 of the ontology 114 is shown. In FIG. 4, the portion 400 of the ontology 114 is depicted as a graph that defines a semantic relationship 402 between an "ARRIVAL LOCATION" concept 404, a "LOCATION" concept 406, an "AIRPORT" concept 408, a "CITY" concept 410, and a "STATE" concept 412. As seen in FIG. 4, the example ontology 114 defines the "ARRIVAL LOCATION" concept 404 to be a hypernym of the "LOCATION" concept 406, which is further defined as a hypernym of the "AIRPORT" concept 408, the "CITY" concept 410, and the "STATE" concept 412. The example ontology 114 also defines relationships between the relatively low-level concepts 408-412 and various n-grams that may appear in a text sample. As shown by way of example in FIG. 4, the example ontology 114 indicates the "ORD" airport code 414a and the "JFK" airport code 414b are each associated with the "AIRPORT" concept 408. Similarly the example ontology 114 indicates the city 416a of "Chicago" and the city 416b of "New York" are each associated with the "CITY" concept 410 and indicates that the state 418a of "Illinois" and the state 418b of "New York" are associated with the "STATE" concept 412. It will be appreciated that the portion 400 of the ontology 114 is but one example of an ontology that may be selectively employed during the text annotation process. Other ontologies defining additional or alternative semantic relationships may be selectively employed.

Some concepts of the ontology 114 may be referred to as intention concepts (or intentions) as such concepts may be utilized to tag n-grams of text samples in order to indicate the intent of a user. Examples of concepts that indicate an intent to travel via airplane may include the "BOOK_FLIGHT" intention concept and the "FLY" intention concept. The ontology 114 may also define semantic relationships between intention concepts and other concepts of the ontology. An example semantic relationship 420 between an intention concept 422 and other concepts 424-428 defined in the ontology is shown by way of example in FIG. 4. In this example, the ontology 114 defines a semantic relationship 420 between an intention to select a meal preference on a flight, the "I_FOOD_SELECTION" intention 422, and other concepts defined related to a flight meal preference, e.g., a "FOOD_SELECTION" concept 424, a "MEAL_TYPE" concept 426, and a "FLIGHT" concept 427. Additional and alternative examples of semantic relationships between intention concepts and other concepts defined in an ontology will be appreciated. As described further below, the annotation module 102 may utilize the relationships between intention concepts and other concepts in the ontology to recommend intention concepts and suggest annotations for n-grams of text samples.

Referring back to FIG. 1, the annotation module 102 may query or perform a lookup of the ontology 114 during the annotation process to identify one or more concepts that correspond to or are otherwise associated with an n-gram of a text sample. The annotation module 102 may likewise query or perform a lookup of the ontology 114 to identify one or more hypernyms of an annotation that are hyponyms of other concepts as defined by the ontology 114. The annotation process is described in further detail in U.S. patent application Ser. No. 14/188,206 to Rachevsky et al. which is incorporated by reference.

Figure 5:
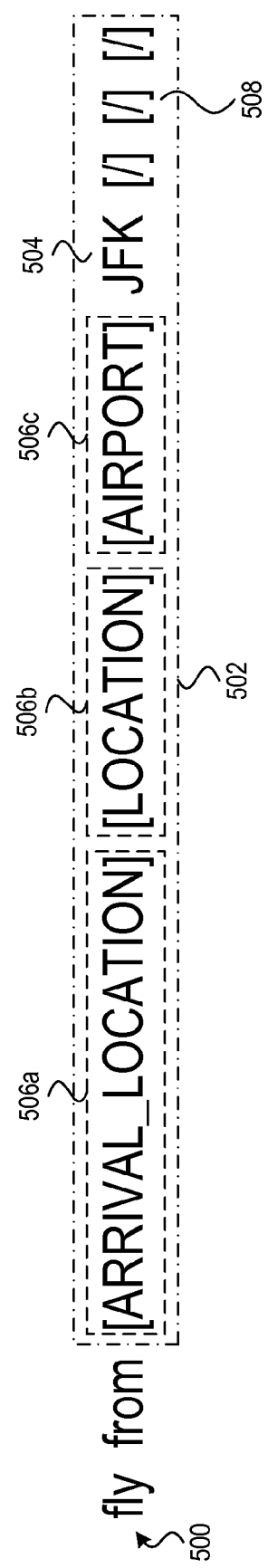
FIG. 5 is an illustration of an example tagged annotation according to illustrative aspects described herein.

As also noted above, the annotation module 102 may also utilize the ontology 114 to generate a tagged annotation having a nested hierarchy of hypernym tags that wraps an n-gram. Referring briefly to FIG. 5, an example of a tagged annotation 500 having a nested hierarchy of hypernym tags 502 is shown. In this example, the nested hierarchy of hypernym tags 502 wraps the 1-gram 504 of "JFK" in the tagged annotation 500. The annotation module 102 may construct the nested hierarchy of hypernym tags 502 based on an ontology such as ontology 114, which defines the semantic relationship "ARRIVAL_LOCATION"→"LOCATION"→"AIRPORT" as seen in FIG. 4. Based on these semantically-related concepts, the annotation module 102 may construct the nested hierarchy of hypernym tags 502, which includes a hypernym tag 506a for the "ARRIVAL LOCATION" concept, a hypernym tag 506b for the "LOCATION" concept, and a hypernym tag 506c for the "AIRPORT" concept. In this way, a tagged annotation indicates the sequence of concepts between a concept selected to annotate an n-gram of a text sample and one or more relatively higher-level or lower-level concepts semantically related to the selected concept. As seen in FIG. 5, the tagged annotation includes respective closing tags 508 for each hypernym tag of the nested hierarchy of hypernym tags 502.

Referring back to FIG. 1, the annotation module 102 may be configured, in some example implementations, to automatically construct nested hierarchies of hypernym tags for tagged annotations based on the following criteria. If (i) the user has selected a top-level hypernym for an n-gram, (ii) the grammar 116 parses the n-gram, and (iii) the ontology 114 defines a unique semantic path between the top-level hypernym and the lowest-level hypernym of the grammar that parses the n-gram, then the annotation module 102 may construct the nested hierarchy of hypernym tags based on the defined path in the ontology between the top-level hypernym and the low-level hypernym.

In some example implementations, the annotation module 102 may receive input from the user via the annotation interface 118 during the annotation process. The annotation interface 118 may include an output interface such as a graphical user interface (GUI) that displays text samples to be annotated and suggested annotations for the text sample. The annotation interface 118 may also include one or more input interfaces to receive input from the user via one or more input devices such as a keyboard or pointing device. Through the input interfaces of the annotation interface 118, a user may confirm an automatically suggested annotation for a text sample, select a different suggested annotation for a text sample, provide a new annotation for a text sample, and so forth. A user may also select or provide individual annotations for individual n-grams of a text sample through the annotation interface 118. The annotation interface 118 may, for example, present suggested annotations for a text sample or n-gram in a context menu when the user respectively selects the text sample or n-gram presented at the annotation interface.

Figure 6:
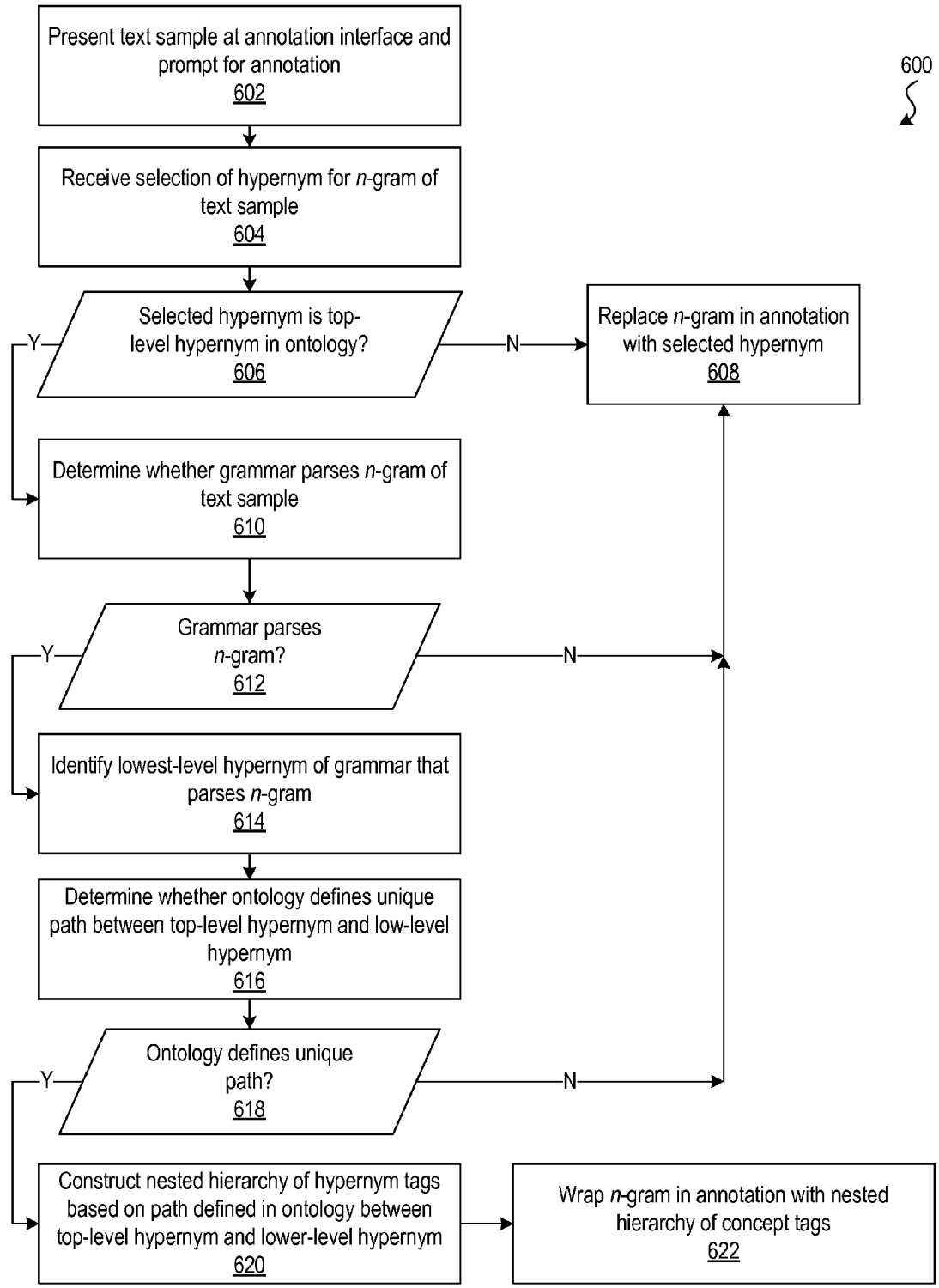
FIG. 6 is a flowchart of example method steps for constructing a nested hierarchy of hypernym tags according to illustrative aspects described herein.

Referring briefly to FIG. 6, a flowchart 600 of example method steps for generating a tagged annotation and constructing a nested hierarchy of hypernym tags is shown. The annotation interface may present a text sample to be annotated and prompt the user to confirm or select an annotation for the text sample (block 602). The annotation interface may receive a selection of a hypernym for an n-gram of the text sample (block 604). For example, the user may annotate the n-gram of "JFK" with the hypernym of "ARRIVAL_LOCATION." The annotation module may then determine whether the selected hypernym is a top-level hypernym in the ontology (block 606). A hypernym may be a top-level hypernym if the ontology does not define any ancestors for the hypernym. If the selected hypernym is not a top-level hypernym (block 606:N), then the annotation module may not wrap the n-gram in a nested hierarchy of hypernym tags. Instead the annotation module may simply replace the n-gram with the selected hypernym (block 608).

If the user has selected a top-level n-gram (block 606:Y), then the annotation module may determine whether the grammar parses the n-gram (block 610). If the grammar does not parse the selected n-gram (block 612:N), then the annotation module may again simply replace the n-gram with the selected hypernym (block 608). If, however, the grammar does parse the n-gram (block 612:Y), then the annotation module may identify the lowest-level hypernym of the grammar that parses the n-gram (block 614) and determine whether the ontology defines a unique path between the top-level hypernym and the lower-level hypernym (block 616). For example, a grammar may include a grammar rule that parses the n-gram of "JFK" with the hypernym of "AIRPORT," and an ontology may define a semantic relationship such as "ARRIVAL_LOCATION"→"LOCATION"→"AIRPORT." If the ontology does not define a unique path between the hypernyms (block 618:N), then the annotation module may simply replace the n-gram with the selected hypernym (block 608). If, however, the ontology does define a unique path between the hypernyms (block 618:Y), then the annotation module may construct a nested hierarchy of hypernym tags based on the path between the hypernyms defined in the ontology (block 620). For example, the annotation module may construct the following nested hierarchy of hypernym tags based on the path defined by the example semantic relationship mentioned above: [ARRIVAL_LOCATION] [LOCATION] [AIRPORT] . . . [/] [/] [/].

The annotation module may then generate an annotation for the text sample and wrap the n-gram with the nested hierarchy of hypernym tags (block 622). Continuing the example above, the annotation module may generate an annotation that wraps the n-gram of "JFK" as follows: . . . [ARRIVAL_LOCATION] [LOCATION] [AIRPORT] JFK [/][/][/] . . . In this way, a user may advantageously observe the relatively higher-level or relatively-lower level hypernyms selected for an n-gram of the annotation. It will be appreciated that the steps for wrapping an n-gram of an annotation with a nested hierarchy of hypernym tags are described by way of example only and that additional and alternative approaches may be selectively employed.

Referring again to FIG. 1, the classifier module 104 may be configured to, in operation, classify annotation candidates for a text sample or an n-gram of the text sample. Classification of annotation candidates may include scoring the annotation candidates. The classifier module 104 may determine a score for each of the annotation candidates in a list of annotation candidates. The annotation module 102 may thus, in turn, select one of the annotation candidates as the annotation for the text sample or an n-gram of the text sample based on their respective scores. In some example implementations, the score for an annotation candidate may be employed as a weight for the annotation candidate. The classifier module 104 may utilize a statistical classifier to score the annotation candidates of a list of annotation candidates. Scoring and classifying annotation candidates are described in U.S. patent application Ser. No. 14/188,206 to Rachevsky et al., which is incorporated by reference.

As noted above, the present disclosure provides improvements to the annotation candidates suggested for a text sample or an n-gram of the text sample. Improvements to the suggested annotations may be achieved by configuring the annotation module 102 to exclude one or more annotation candidates from the list of annotation candidates. Excluding an annotation candidate from the list of annotation candidates may be accomplished by removing an annotation candidate from a list of annotation candidates and, additionally or alternatively, refraining from including an annotation candidate in a list of annotation candidates. In some example implementations, the annotation module 102 may iterate over the list of annotation candidates and filter any annotation candidates that i) include a concept that is a hyponym of a concept included in another annotation candidate of the list, and ii) cover a smaller portion of the text sample being annotated than the other annotation candidate.

As an example, the text sample, "book flight to JFK," may be selected for annotation. The list of annotation candidates, in this example, may be based on the ontology 402 of FIG. 4 and may include, e.g., the annotation candidate, "flight to [AIRPORT] JFK [/]," as well as the annotation candidate, "book flight to [ARRIVAL_LOCATION] JFK [/]." As seen in this example, the latter annotation candidate includes the relatively higher-level concept, "ARRIVAL_LOCATION," and includes a larger portion of the text sample compared to the former annotation candidate ("book flight to" versus "flight to"). It will thus be appreciated that the former annotation candidate includes a relatively lower-level concept compared to the latter annotation candidate and covers a smaller portion of the text sample compared to the latter annotation candidate. As a result the annotation module may, in this example, exclude the former annotation candidate from the list of annotation candidates suggested to the user. The annotation module may also exclude an annotation candidate form the list of annotation candidates if the training corpus does not include features that match the n-grams of the annotation candidate.

Figure 7:
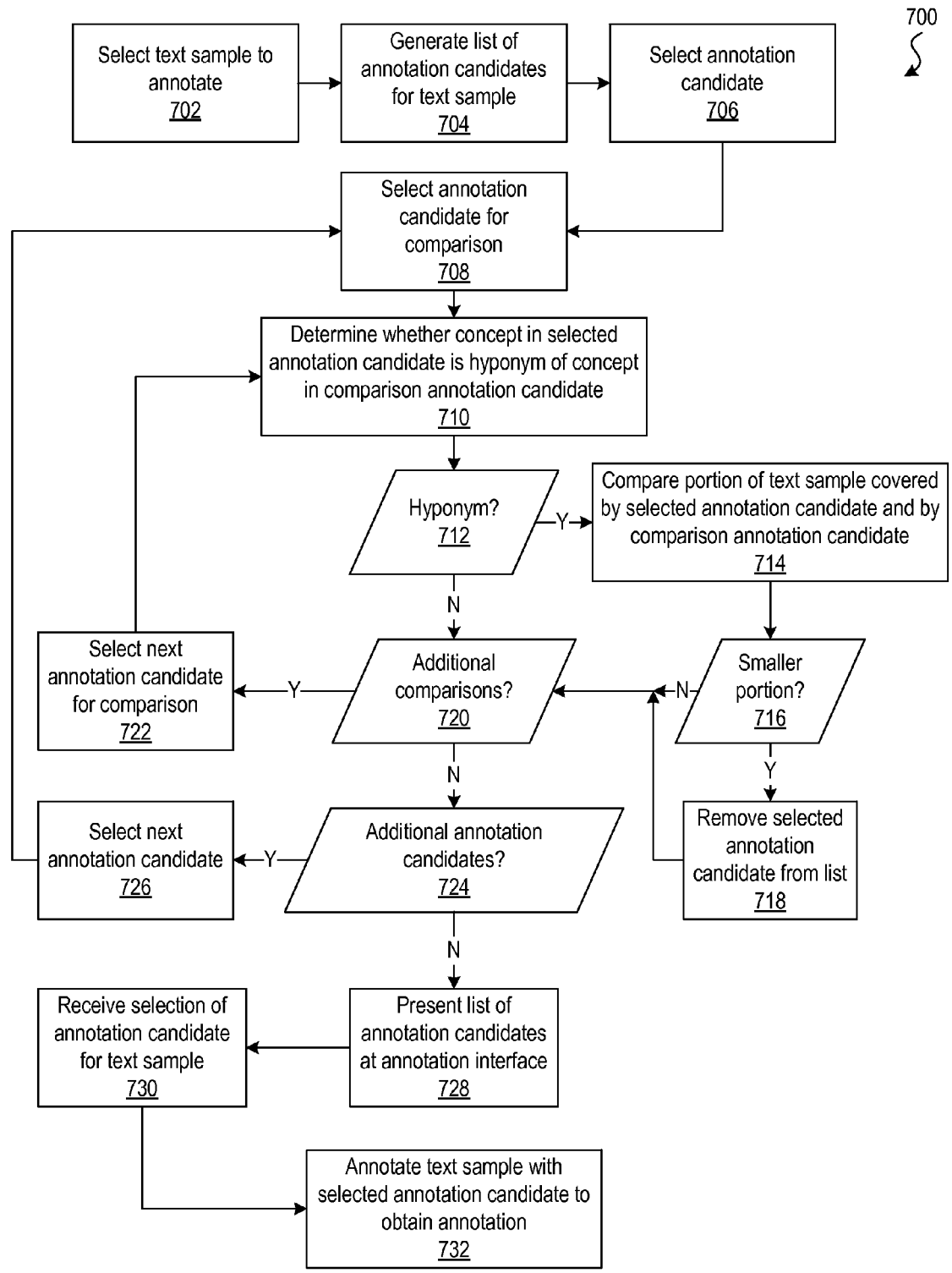
FIG. 7 is a flowchart of example method steps for improving the list of annotation candidates suggested for a text sample according to illustrative aspects described herein.

In FIG. 7, is a flowchart 700 of example method steps for improving the list of annotation candidates suggested for a text sample. A text sample to annotate may be selected (block 702), e.g., manually by a user or automatically by the annotation module. The annotation module may generate a list of annotation candidates for the text sample (block 704) as described in commonly-owned U.S. patent application Ser. No. 14/188,206 to Rachevsky et al., which is incorporated by reference. To improve the list of annotation candidates suggested to the user, the annotation module may filter the list of annotation candidates to exclude one or more of the annotation candidates.

In some example implementations, the annotation module may select one of the annotation candidates from the list (block 706), and select another one of the annotation candidates form the list for comparison (block 708). The annotation module may then compare the respective concepts (e.g., a concept or concept tag) included in the selected annotation candidate and the annotation candidate selected for comparison (block 710). If the concept of the selected annotation candidate is a hyponym of the concept in the annotation candidate selected for comparison (block 712:Y), then the annotation module may compare the respective portions of the text sample covered by the selected annotation candidate and the annotation candidate selected for comparison (block 714). If the selected annotation candidate covers a smaller portion of the text sample compared to the annotation candidate selected for comparison (block 716:Y), then the annotation module may exclude the selected annotation candidate from the list of annotation candidates selected for comparison (block 718).

The annotation module may, in some example implementations, compare a selected annotation candidate to each annotation candidate in the list of annotation candidates. Therefore if the concept in the selected annotation candidate is not a hyponym of the concept in the annotation candidate selected for comparison (block 712:N), or if the selected annotation candidate does not cover a smaller portion of the text sample compared to the annotation candidate selected for comparison (block 716:N), then the annotation module may determine if any annotation candidates remain to be selected for comparison (block 720). If there are additional annotation candidates to compare to the selected annotation candidate (block 720:Y), then the annotation module may select the next annotation candidate (block 722) for comparison to the selected annotation candidate and repeat these steps for the next annotation candidate selected for comparison.

The annotation module may also, in some example implementations, analyze each annotation candidate in the list of annotation candidates in order to determine whether to exclude the annotation candidate for the list. Accordingly, having analyzed one of the annotation candidates, the annotation module may determine whether any additional annotation candidates remain to be analyzed (block 724). If additional annotation candidates remain to be analyzed (block 724:Y), then the annotation module may select the next annotation candidate in the list (block 726) and repeat these steps for the next selected annotation candidate.

Once no additional annotation candidates of the list remain to be analyzed (block 724:N), the annotation module may provide the list of annotation candidates to the annotation interface for presentation to a user (block 728) in order to annotate the text sample. It will be appreciated that, having performed the steps described above, the list of annotation candidates may be a filtered list of annotation candidates from which the annotation module excluded one or more annotation candidates. The annotation interface may receive a selection of one of the annotation candidates from the user (block 730) and annotate the text sample using the selected annotation candidate in order to obtain an annotation for the text sample (block 732). It will be appreciated that the criteria used to filter the list of annotation candidates described above is described by way of example only. Additional or alternative criteria may be selectively employed to filter the list of annotation candidates thereby improving the annotation candidates suggested to the user during the annotation process. Moreover, the set of annotations generated via the text annotation process may be utilized to generate statistical engines that are utilized to automatically annotate subsequent text samples, e.g., during processing of a text sample obtained from audio at a speech application.

As another example, the intention for an n-gram may be utilized to construct or filter the list of annotation candidates that may be selected for the n-gram. When an intention is selected for an n-gram, e.g., when the n-gram is tagged with the intention concept, the annotation module may query the ontology for other concepts semantically-related to the selected intention concept. The annotation module may thus include the concepts associated with the selected intention concept in the list of annotation candidates for the n-gram. The list of annotation candidates may therefore include only those concepts that are semantically-related to the selected intention concept and exclude concepts that are not semantically-related to the selected intention concept. If the list of annotation candidates is constructed before an intention concept is selected, then the annotation module may filter the list of annotation candidates when the intention concept is selected. The annotation module may, for example, iterate over the list of annotation candidates and determine whether a concept listed is semantically-related to the selected intention concept in the ontology. If the concept is not semantically-related to the selected intention concept, then the annotation module may remove that concept from the list of annotation candidates. In this way the speed and consistency of annotating n-grams is advantageously improved.

Referring back to FIG. 1, the quality assurance module 106 may be configured to, in operation, automatically perform one or more quality assurance checks on the set of annotations 112. The quality assurance module 106 may flag an annotation when performing a quality check and provide notification to a user that the annotation has been flagged. The user may then review the flagged annotation to determine whether the annotation, e.g., includes any errors or has other issues that warrant review. If so the user may revise the annotation. The quality assurance module 106 may, for example, cause presentation of a list of flagged annotations at a GUI of the annotation review interface 120. A user may select via the annotation review interface 120 one of the flagged annotations from the list, and the annotation review interface may present the flagged annotation selected to the user. The annotation review interface 120 may also present information that indicates the reason the quality assurance module 106 flagged the annotation. Furthermore the annotation review interface 120 may list one or more solutions the user may select to automatically address the issue. The user may thus review the flagged annotation selected and determine whether any revisions to the annotation are needed. The user may revise the annotation by adding a new hypernym or hypernym tag to the annotation, deleting an existing hypernym or hypernym tag from the annotation, or replacing an existing hypernym or hypernym tag with a different hypernym or hypernym tag. These example options may be presented to the user as ways to address the issue that caused the annotation to be flagged. The quality assurance module 106 may be configured to initiate automated performance of an option selected by the user. In this way the quality assurance module 106 advantageously enables a user to review and correct annotations relatively quickly. The quality assurance module 106 also advantageously enables a user to confirm the set of annotations 112 is consistent with a current version of the ontology 114.

Furthermore the quality assurance checks improve the set of annotations 112 (the annotation corpus) such that the NLU processing performed by NLU systems is also advantageously improved. NLU systems may include NLU engines that may be selectively configured to operate using various data-driven techniques. One such data-driven technique utilizes grammars inferred from the annotations of an annotation corpus. Another data-driven technique trains statistical classifiers or configures statistical models using the annotation of an annotation corpus. Some NLU engines may be configures to employ a hybrid approach in which both inferred grammars and statistical classifiers are utilized for NLU processing. Such NLU engines may thus be referred to as hybrid NLU engines.

Due to the reliance on the annotation corpus, it will be appreciated that the quality of the output of an NLU engine may depend on the quality of the annotation corpus provided as input to the NLU engine. The quality assurance checks described in further detail below improve the quality of the annotation corpus which in turn improves the NLU processing output of annotation engines relying on that annotation corpus for data-driven NLU processing. It will also be appreciated that the improved annotation corpus may be provided to third-parties such that those parties may also realize the benefits of the improved annotation corpus during the development of their own NLU systems.

Figure 8:
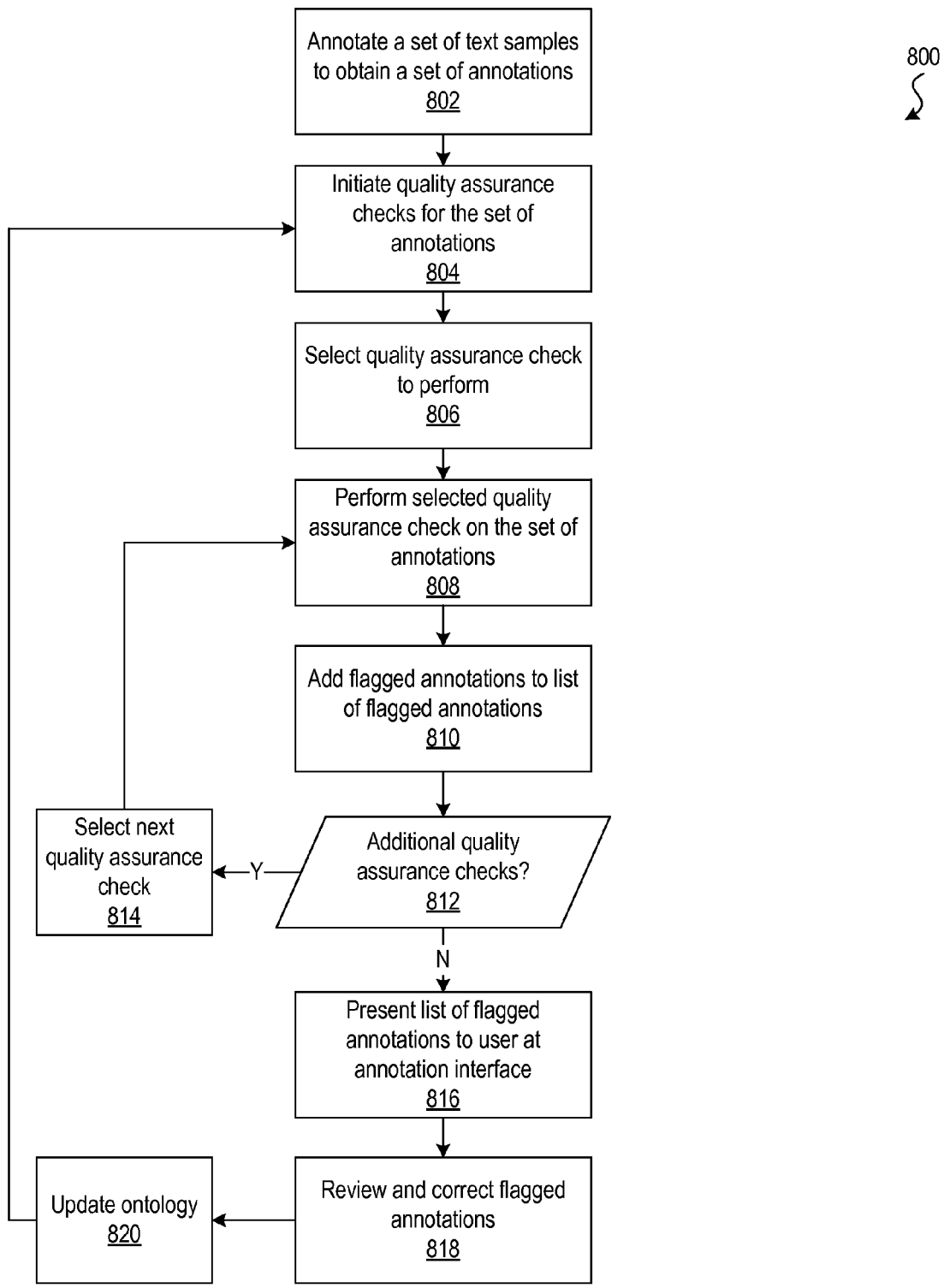
FIG. 8 is a flowchart of example method steps for performing a set of quality assurance check according to illustrative aspects described herein.

In FIG. 8 a flowchart 800 of example method steps for performing one or more quality assurance checks on a set of annotations is shown. A user may utilize an annotation module to annotate a set of text samples and obtain a set of annotations (block 802) as described above. The user may then initiate a set of automated quality assurance checks for the set of annotations (block 804) performed by a quality assurance module. The user may specify one or more quality assurance checks to perform or the quality assurance module may automatically perform each quality assurance check during the quality assurance process. The quality assurance module may select one of the quality assurance checks to perform (block 806) and automatically perform the quality assurance check on the set of annotations (block 808). During the quality assurance check, the quality assurance module may flag one or more annotations based on various criteria described in further detail below. The quality assurance module may add annotations flagged during the quality assurance check to a list of flagged annotations (block 810). In this way, the quality assurance module may configure the list of flagged annotations to include one or more annotations. The list of flagged annotations may be, e.g., a list of unique identifiers respectively corresponding to the annotations stored at the data store. Accordingly the quality assurance module may configure the list of flagged annotations to include a flagged annotation by adding the unique identifier to the list of flagged annotations. The quality assurance module may also group the list of flagged annotations according to the quality assurance check that flagged the annotation. The list of flagged annotations may thus include unique identifiers for each quality assurance check performed, and the quality assurance module may group flagged annotations by associating the unique identifier of the flagged annotation with the unique identifier of the quality assurance check. It will be appreciated that the list of flagged annotations may include one or more annotations flagged during performance of one or more quality assurance checks.

As noted above, the quality assurance module may include in the list of flagged annotations information indicating the reason the quality assurance module flagged the annotation. The information may also include, e.g., information identifying the quality assurance check that flagged the annotation. Upon completion of the quality assurance check, the quality assurance module may determine whether there are any additional quality assurance checks to perform (block 812). If there are additional quality assurance checks to perform (block 812:Y), then the quality assurance module may select the next quality assurance check (block 814) and repeat these steps for the next selected quality assurance check. It will also be appreciated that no annotations may be flagged during performance of one or more quality assurance checks in which case the annotation review interface may inform a user that the ontology, grammar, and set of annotations have passed each of the quality assurance checks performed.

If there are no additional quality assurance checks to perform (block 812:N), then the quality assurance module may provide the list of flagged annotations to the annotation review interface for presentation to the user (block 816). As noted above, the list of flagged annotations may be grouped by type of quality assurance check. Accordingly the annotation review interface may display groups of flagged annotations grouped and ordered according to type of quality assurance check. The annotation review interface may, for example, allow the user to select one of the quality assurance checks and present only those annotations flagged during the quality assurance check selected. The annotation review interface may also, for example, allow the user to select one of the flagged annotations for review. Selecting a flagged annotation from the list may cause the annotation review interface to present information associated with the flagged annotation, e.g., the information indicating the reason the quality assurance module flagged the annotation, the hypernyms of the annotation, the grammar rules and ontology definitions associated with those hypernyms, and so forth. Selecting a flagged annotation from the list may also cause the annotation interface to present the flagged annotation selected thus allowing the user to modify one or more hypernyms of the annotation. In this way, a user may review flagged annotations, and if desired, modify the hypernyms used to annotate the annotation (block 818). A user may also dismiss a flagged annotation via the annotation review interface upon review of the annotation and determination that no corrections to the annotation are needed.

The quality assurance module may perform the quality assurance checks to, among other things, ensure consistency between the ontology defined for a natural language processing application. It will be appreciated that the ontology may undergo various revisions during development of the application. Therefore when natural language application developers update the ontology (block 820), and these steps may be repeated to ensure the set of annotations conform to and are consistent with the updated ontology. Because the quality assurance module automates performance of the quality assurance checks, the process of analyzing and validating the set of annotations may advantageously be performed relatively quickly. Moreover the quality assurance checks improve the quality of the set of annotations 118 which in turn improves the quality of the data-driven NLU engines as described above.

As noted above with reference to FIG. 1, the quality assurance module 106 may provide various quality assurance checks that improve the quality of the set of annotations 112, synchronize the set of annotations with revisions to the ontology 114, and speed up the annotation review process, and improve the quality of the annotations. In some example implementations, the quality assurance module 106 may provide the following quality assurance checks: an arrangement consistency check; a grouping consistency check; a annotation completeness check; an acyclic grammar verification check; and an ontology consistency check. Each of these types of quality assurance checks are described in further detail below with respective reference to FIGS. 9-13.

The arrangement consistency quality assurance check verifies that annotations for similar text samples are arranged in a similar way. Stated differently the arrangement consistency quality assurance check determines whether the hypernyms of annotations for similar text samples are inconsistently arranged. If the arrangement of hypernyms in the respective annotations for similar text samples is inconsistent, then the quality assurance module may flag the annotations for further review as described above.

As an example, the set of text samples may include the following similar text samples: "next flight to San Diego" and "next flight to London." During the annotation process, the following annotations may be generated based on these text samples: "[FLIGHT] [ORDER] next [/] flight to [ARRIVAL_LOCATION] [LOCATION] [CITY] San Diego [/] [/] [/] [/]" and "[ORDER] next [/] [FLIGHT] flight to [ARRIVAL_LOCATION] [LOCATION] [CITY] Los Angeles [/] [/] [/] [/]." In the former annotation, the "ORDER" hypernym tag is wrapped by (i.e., inside) the "FLIGHT" hypernym tag. In the latter annotation, the "ORDER" hypernym tag is not wrapped by (i.e., outside) the "FLIGHT" hypernym tag. The quality assurance module may identify this inconsistency during the arrangement consistency quality assurance check and flag the annotations for further review. A user may thus review the flagged annotations at the annotation review interface and, if desired, correct one of the annotations at the annotation interface to ensure consistency between the arrangement of hypernym tags for the annotations of the similar text samples.

Figure 9:
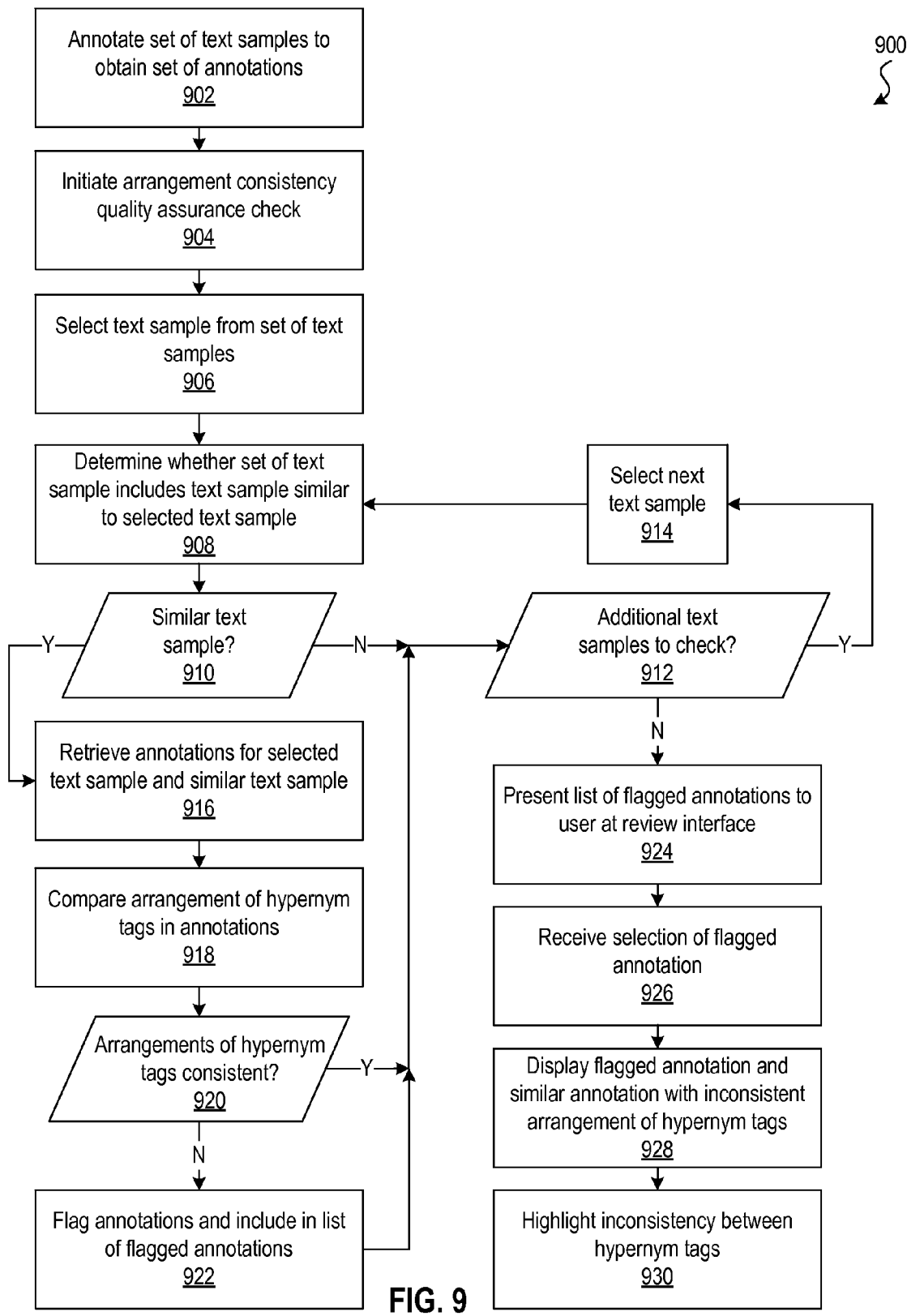
FIG. 9 is a flowchart of example method steps for performing a first type of quality assurance check according to illustrative aspects described herein.

FIG. 9 illustrates a flowchart 900 of example method steps for performing an arrangement consistency quality assurance check. A user may utilize an annotation module to annotate a set of text samples and obtain a set of annotations (block 902) as described above and initiate the arrangement consistency quality assurance check (block 904). The user may manually initiate the arrangement consistency quality assurance check, or the quality assurance module may automatically initiate the arrangement consistency quality assurance check. Once initiated the quality assurance module may select one of the text samples from the set of text samples (block 906) and determine whether the set of text samples includes a text sample similar to the selected text sample (block 908). A text sample may be similar to the selected text sample when, for example, the text sample differs from the selected text sample by only one word. It will be appreciated, however, that the quality assurance module may be configured to apply additional and alternative criteria in order to identify text samples that are similar to the selected text sample. The criteria used to identify similar text samples may thus depend on the constraints or goals of the particular implementation in which the quality assurance module is employed.

If the set of text samples does not include text samples similar to the selected text sample (block 910:N), then the quality assurance module may determine whether additional text samples remain to be analyzed (block 912). If there are additional text samples that remain to be analyzed (block 912:Y), then the quality assurance module may select the next text sample (block 914) and repeat these steps for the next selected text sample. If, however, the set of text samples does include a text sample similar to the selected text sample (block 910:Y), then the quality assurance module may retrieve the respective annotations for the selected text sample and the similar text sample (block 916). The quality assurance module may then compare the respective arrangements of the hypernym tags in the annotations (block 918). If the arrangements of the hypernym tags in the annotations are consistent (block 920:Y), then the annotations need not be flagged. The quality assurance module may thus determine if additional text samples remain to be analyzed and, if so, repeat these steps for the next selected text sample.

If, however, the arrangements of hypernym tags in the annotations are not consistent (block 920:N), then the quality assurance module may flag the annotations and add the annotations to a list of flagged annotations (block 922). The quality assurance module may also include in the list of flagged annotations information to associate the annotations having the inconsistent arrangements of hypernym tags, information indicating that the annotations were flagged during the arrangement consistency quality assurance check, and any other information that may be useful to determine whether corrections to the text samples or annotations are needed when reviewing the flagged annotations.

When no additional text samples remain to be analyzed during the arrangement consistency quality assurance check (block 912:N), the quality assurance module may provide the list of flagged annotations to the annotation review interface for presentation to a user (block 924). The annotation review interface may receive a selection of one of the flagged annotations (block 926), and display the flagged annotation selected along with the related annotation having an inconsistent arrangement of hypernym tags (block 928). The annotation review interface may also, for example, highlight the inconsistencies in the respective arrangements of the hypernym tags in each of the flagged annotations under review (block 930). As described above, the user may provide corrections to one or more of the flagged annotations via the annotation interface in order to correct the inconsistencies in the arrangement of the hypernym tags.

The grouping consistency quality assurance check determines whether semantically-similar annotations have been annotated with a common (i.e., the same) hypernym, e.g., tagged with a common hypernym tag. The quality assurance module may group semantically-similar text samples using semantic clustering techniques in order to obtain one or more groups of text samples. In some example implementations, the semantic clustering techniques described in commonly-owned U.S. Pat. No. 8,515,736 to Duta may be employed to group semantically-similar text samples. If the quality assurance module determines that the text samples of a clustered group of semantically-similar text samples have not been annotated with the same hypernym, then the quality assurance module may flag the annotations of the group for further review.

The grouping consistency quality assurance check may be employed, for example, to determine whether semantically-similar annotations have been tagged with the same intention tag. As an example, the set of text samples may include the following text samples: "book this flight please" and "please book the Monday flight." An annotation module may generate the following annotations for these text samples: "[BOOK_FLIGHT] book [/] this flight please" and "please [FLY] book [/] the Monday flight." A semantic clustering process may group these two text samples as being semantically-similar, and the quality assurance module may compare the hypernyms (intention tags in this example) of the respective annotations of the text samples. Because the semantically-similar text samples have been annotated with different hypernyms, the quality assurance module may flag these annotations during the grouping consistency quality assurance check. A user may review the flagged annotations at the annotation review interface and select a desired hypernym to apply to the flagged annotations of the grouping. In this way, a user may advantageously ensure that semantically-similar text samples are annotated with a common annotation.

Figure 10:
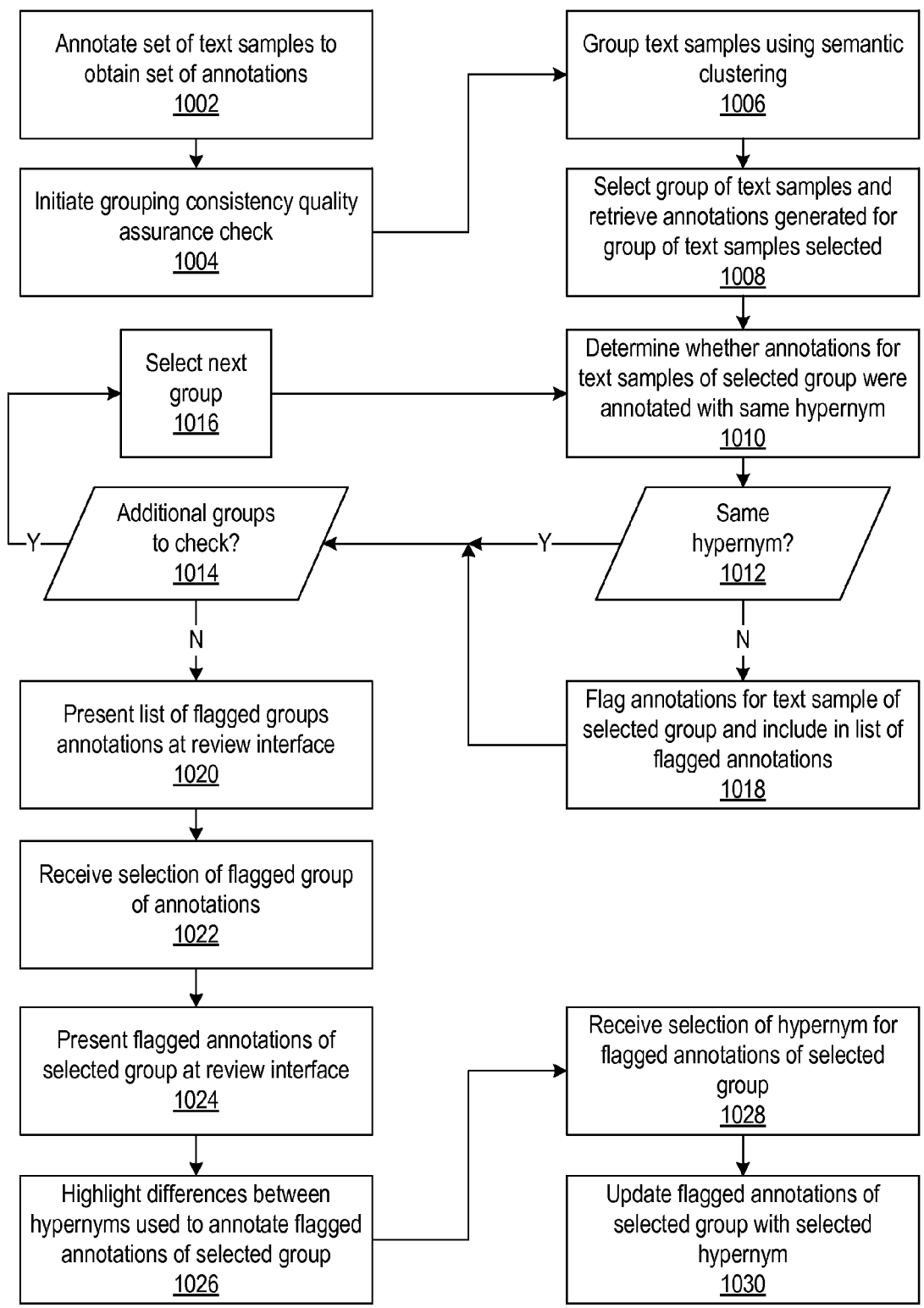
FIG. 10 is a flowchart of example method steps for performing a second type of quality assurance check according to illustrative aspects described herein.

FIG. 10 illustrates a flowchart 1000 of example method steps for performing a grouping consistency quality assurance check. A user may utilize an annotation module to annotate a set of text samples, obtain a set of annotations (block 1002) as described above and initiate the arrangement consistency quality assurance check (block 1004). The quality assurance module may then group semantically-similar text samples (block 1006), e.g., using semantic clustering techniques. The quality assurance module may then select one of the groups of semantically-similar text samples and retrieve the annotations generated for the text samples of the selected group (block 1008). The quality assurance module may then determine whether the annotations for the semantically-similar text samples include the same hypernym (block 1010). If the quality assurance module determines the annotations include the same hypernym (block 1012:Y), then the quality assurance module may determine the annotations need not be flagged and may determine whether any additional groups of semantically-similar text samples remain to be analyzed (block 1014). If additional groups remain to be analyzed (block 1014:Y), then the quality assurance module may select the next group (block 1016) and repeat these steps for the next selected group.

If, however, the annotations for the semantically-similar text samples are not the same (block 1012:N), i.e., if at least one of the annotations includes a different hypernym, then the quality assurance module may flag the annotations and include the flagged annotations in a list of flagged annotation (block 1018). The quality assurance module may then determine if additional groups remain to be analyzed and, if so, repeat these steps for the next selected group of semantically-similar text samples. When no additional groups remain to be analyzed (block 1014:N), the quality assurance module may provide the list of flagged annotations to the annotation review interface for presentation to the user (block 1020). The annotation review interface may group the annotations flagged during the grouping consistency check based on the groups of semantically-similar text samples. The annotation interface may thus receive a selection of one of the groups of flagged annotations (block 1022), and the annotation review interface may present the flagged annotations of the selected group (block 1024). The annotation interface may also highlight the differences between the hypernyms of the flagged annotations in the group (block 1026). In this way, the annotation review interface may enable a user to easily view how the annotation module annotated semantically-similar text sample differently. Additionally the annotation interface may receive a selection of a desired hypernym to apply to each flagged annotation of the group (block 1028), and the annotation interface may update each annotation of the group with the hypernym selected (block 1030). Continuing the example above, a user may select the "FLY" hypernym as the desired intention for the annotations, and the annotation module may update the annotations to such that the following annotations result: "[FLY] book [/] this flight please" and "please [FLY] book [/] the Monday flight." In this way, the user may advantageously ensure that annotations for semantically-similar text samples include consistent hypernyms.

The annotation completeness quality assurance check determines whether an n-gram can be parsed by multiple grammar rules of a grammar derived during the grammar construction process. If the quality assurance module determines that an n-gram can be parsed by multiple rules of the grammar, then the quality assurance module may generate a set of alternative annotations for the text samples containing the n-gram based on those rules. The set of alternative annotations may then be presented for review at the annotation review interface, and a user may accept one of the alternative annotations to add to the set of annotations for an n-gram or text sample. The annotation system may maintain information that associates a grammar rule with the corresponding annotation from which the grammar rule was derived as well as information that associates the annotation with the text sample used to generate the annotation. Accordingly the annotation review interface may enable a user to trace alternative annotations to the respective grammar rules that generated the annotation, the respective annotations that resulted in the grammar rules, and the respective text samples the annotations were based on. The user may then correct a text sample or annotation such that a subsequently derived grammar does not include multiple rules that can parse the n-gram.

During a grammar completeness quality assurance check, the quality assurance module may, for example, determine that a grammar includes multiple rules that parse the n-gram, "Boston." The grammar in this example may include one grammar rule that parses the n-gram, "Boston," as a "CITY" and another grammar rule that parses the n-gram, "Boston," as an "AIRPORT." Additionally the set of text samples may include the following text sample: "I want to fly to Boston." Based on the two grammar rules that parse the n-gram, "Boston," the quality assurance module may create the following set of alternative annotations:

"I want to fly to [ARRIVAL_LOCATION][LOCATION] [CITY] Boston [/] [/] [/]" and

"I want to fly to [ARRIVAL_LOCATION][LOCATION] [AIRPORT] Boston [/] [/] [/]."

The quality assurance module may flag these alternative annotations and present them at the annotation review interface in a list of flagged annotations. Upon selection of the latter alternative annotation at the annotation review interface, the quality assurance module may retrieve the grammar rule that parsed the n-gram, "Boston," as an "AIRPORT" and retrieve the annotation from which this grammar rule was derived. In this example, the set of text samples may include the text sample, "I want to fly from Boston to Boston," which resulted in the following annotation:

"I want to fly from [DEPARTURE_LOCATION] [LOCATION] [CITY] Boston [/] [/] [/] to [ARRIVAL_LOCATION] [LOCATION] [AIRPORT] Boston [/] [/] [/].

As seen in this example, the text sample seemingly indicates the same departure and arrival location. As a result, the annotation generated from this text sample has annotated "Boston" as both a "CITY" and an "AIRPORT" resulting in the multiple grammar rules that parse the n-gram, "Boston." Having detected the multiple grammar rules that parse the n-gram and presenting the alternative annotations at the annotation review interface, the quality assurance module advantageously enables a user to quickly and easily address any ambiguities in the text samples and corresponding annotations from which a grammar is derived.

Figure 11:
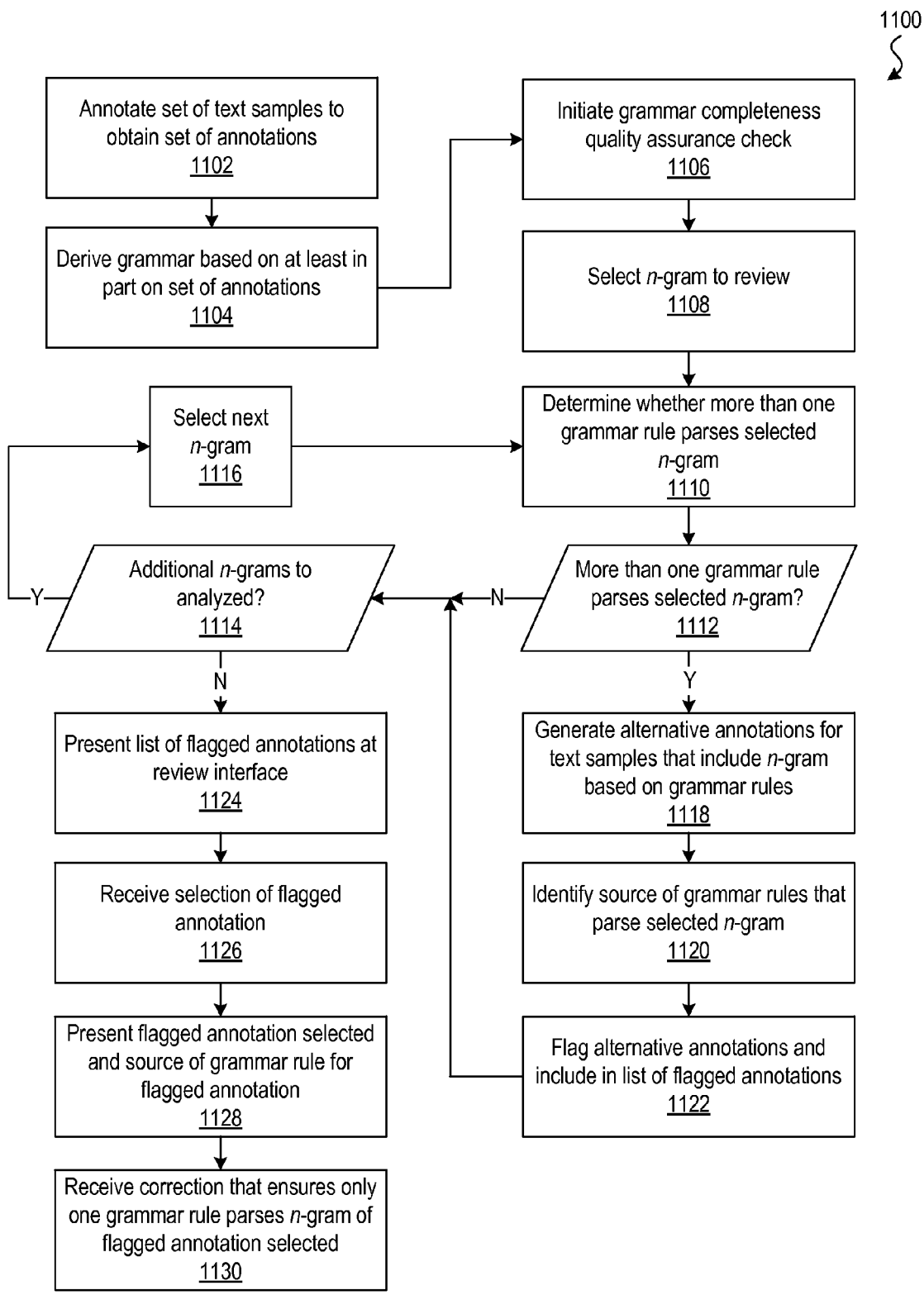
FIG. 11 is a flowchart of example method steps for performing a third type of quality assurance check according to illustrative aspects described herein.

FIG. 11 illustrates a flowchart 1100 of example method steps for performing a grammar completeness quality assurance check. A user may utilize an annotation module to annotate a set of text samples and obtain a set of annotations (block 1102) as described above and derive a grammar based, at least in part, on the set of annotations (block 1104). A grammar completeness quality assurance check may then be initiated (block 1106), e.g., manually by the user or automatically by the quality assurance module. The quality assurance module may select an n-gram to review (block 1108), and parse the n-gram with the derived grammar to determine whether more than one grammar rule parses the n-gram (block 1110). If only one grammar rule parses the n-gram (block 1112:N), then the quality assurance module may determine whether any additional n-grams remain to be analyzed (block 1114). If additional n-grams remain to be analyzed (block 1114:Y), then the quality assurance module may select the next n-gram (block 1116) and repeat these steps for the next selected n-gram.

If, however, more than one grammar rule of the derived grammar parses the n-gram (block 1112:Y), then the quality assurance module may identify text samples in the set of text samples that include the n-gram and generate a set of alternative text annotations based on the multiple grammar rules that parse the n-gram (block 1118). The quality assurance module may also identify the source of the multiple grammar rules (block 1120). As described above, the source of a grammar rule may include the annotation from which the grammar rule was derived, the text sample used to generate that annotation, or both the annotation and corresponding text sample. The quality assurance module may flag the alternative annotations and include the alternative annotations in a list of flagged annotations (block 1122). The quality assurance module may then determine if additional n-grams remain to be analyzed and, if so, repeat these steps for the next selected n-gram.

When no additional n-grams remain to be analyzed (block 1114:N), the quality assurance module may provide the list of flagged annotations to the annotation review interface for presentation to the user (block 1124). The annotation review interface may receive a selection of one of the flagged alternative annotations (block 1126), and the annotation review interface may present the flagged alternative annotation selected along with the grammar rule used to generate the annotation and the source of the grammar (block 1128). The annotation review interface may also highlight the alternative annotations for the n-gram. One or more corrections may be received from the user to correct the text sample or the annotation for the text sample that caused the multiple grammar rules capable of parsing the n-gram (block 1130). Receiving a correction may include receiving a selection of an alternative annotation for an n-gram or text sample. The annotation selected as an alternative annotation may be added to the set of annotations for the text sample or replace an existing annotation in the set of annotations. Using the example above, the user may revise the text sample, "I want to fly from Boston to Boston," to indicate a different destination location, e.g., "I want to fly from Boston to Atlanta." Having revised the text sample, the user may re-run the annotation process and grammar construction process to generate a new set of annotations and derive a new grammar that does not include multiple grammar rules that parse the n-gram.

In another example, the text sample "I want to fly to Georgia" may receive the following annotation: "I want to fly to [STATE] Georgia [/]." Because a grammar may include multiple grammar rules that parse "Georgia," however, e.g., as a state or country, the annotation completeness check may propose the alternative annotation of, "I want to fly to [COUNTRY] Georgia [/]." The user may then select the alternative annotation proposed to include in the set of annotations for the text sample.

The acyclic grammar verification quality assurance check determines whether the derived grammar includes any cycles. When defining the ontology, relatively weak ontology constraints may result in a hypernym being its own ancestor. A grammar derived from such an ontology may lead to self-references in the grammar causing one or more cycles. During the acyclic grammar verification quality assurance check, the quality assurance module determines whether the derived grammar includes any cycles and, if so, flags any annotations that include hypernyms associated with the cycle. The flagged annotations may be presented at the annotation review interface where the user may correct the annotation and the ontology. As an example, an ontology may define the relationship, "LOCATION"→"ARRIVAL_LOCATION"→"LOCATION"→"AIRPORT" in which the hypernym "LOCATION" is defined to be its own ancestor. The quality assurance module may thus flag annotations that include one or more of these hypernyms during the acyclic grammar verification quality assurance check for further review by a user.

Figure 12:
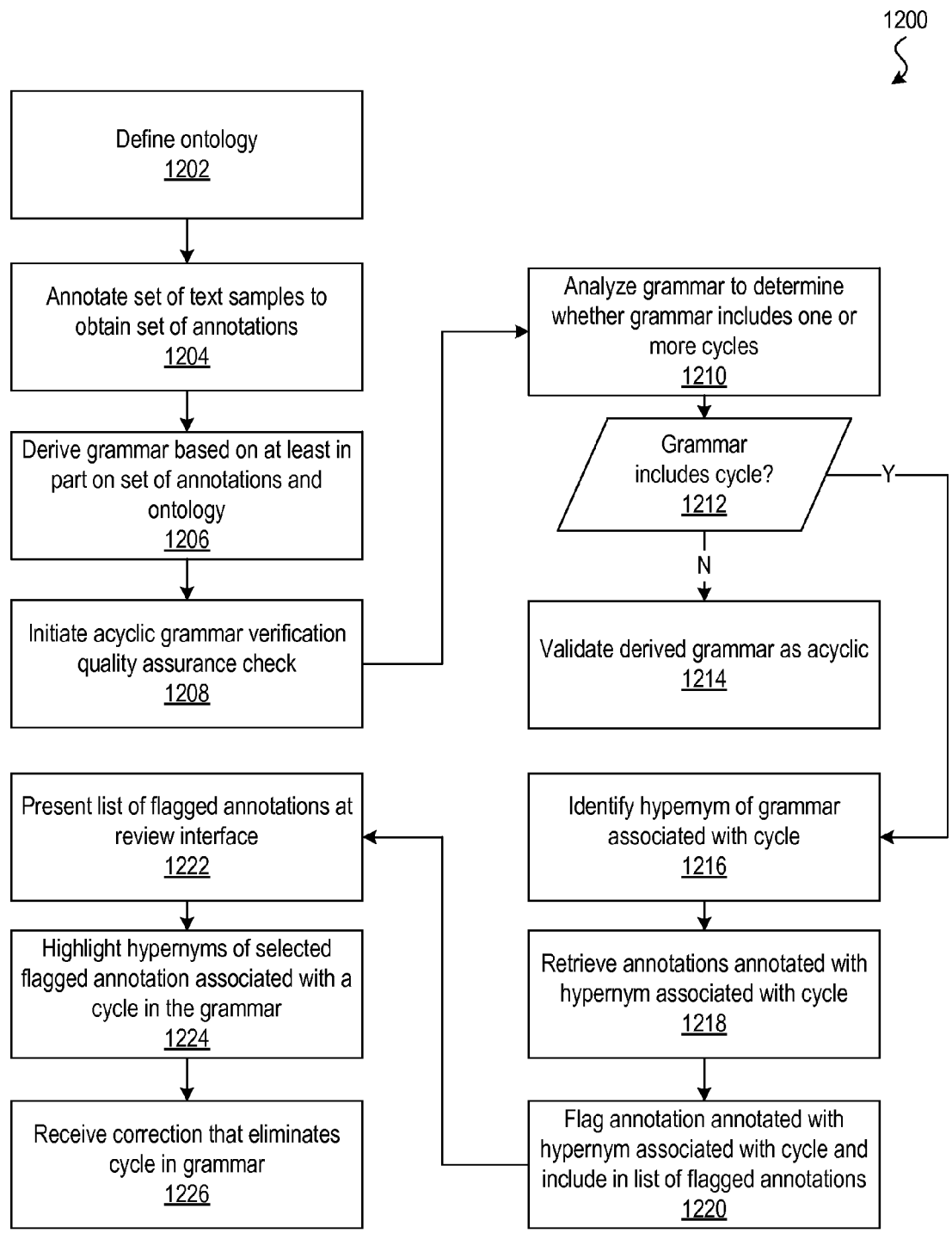
FIG. 12 is a flowchart of example method steps for performing a fourth type of quality assurance check according to illustrative aspects described herein.

FIG. 12 illustrates a flowchart 1200 of example method steps for performing an acyclic grammar quality assurance check. A user may define an ontology (block 1202) and annotate a set of text samples to obtain a set of annotations (block 1204) as described above. The user may then derive a grammar based, at least in part, on the ontology and the set of annotations (block 1206). The acyclic grammar verification quality assurance check may then be initiated (block 1208), e.g., manually by the user or automatically by the quality assurance module. The quality assurance module may then analyze the grammar to determine whether the grammar includes one or more cycles (block 1210). Various techniques may be selectively employed to determine whether the grammar includes a cycle. Those familiar with graph theory will recognize that the derived grammar may be a type of graph, e.g., a directed graph. Accordingly, in some example implementations, the quality assurance module may be configured to employ a depth-first search of the grammar to determine whether it includes any cycles.

If the derived grammar does not include any cycles (block 1212:N), then the quality assurance module may validate the grammar as an acyclic grammar (block 1214). If, however, the quality assurance module determines that the grammar includes a cycle (block 1212:Y), then the quality assurance module may identify one or more hypernyms of the cycle (block 1216). The quality assurance module may then retrieve the annotations that include the one or more hypernyms associated with the cycle (block 1218). The quality assurance module may flag those annotations and include the flagged annotations in a list of flagged annotations (block 1220). The quality assurance module may then provide the list of flagged annotations to the annotation review interface (block 1222) for review by the user. The annotation review interface may also highlight the hypernyms involved in the cycle (block 1224). The user may then provide one or more corrections that eliminate the cycle in the grammar (block 1226). For example, the user may revise the ontology such that a hypernym is not defined to be its own ancestor. Having corrected the ontology, the user may re-run the grammar construction process to derive a new grammar that does not include any cycles. The user may also re-run the acyclic grammar verification quality assurance check on the newly derived grammar to ensure the cycle has been eliminated.

The ontology consistency quality assurance check determines whether the set of annotations is consistent with the current ontology. During development of a speech application, a developer may revise an ontology to modify existing semantic relationships or add new semantic relationships. As the developer adds or modifies semantic relationships, the developer may add or remove hypernyms. In order to ensure the set of annotations are consistent with the current version of an ontology, the quality assurance module may identify annotations having hypernyms that are not defined in the ontology or identify annotations having nested hierarchies of hypernyms that do not correspond to the relationships defined in the ontology. The quality assurance module may also identify hypernyms defined in the ontology that do not appear in any annotation of the set of annotations. The quality assurance module may flag any annotations that are inconsistent with the current version of the ontology, and the annotation review interface may present the flagged annotations to the user for review. The annotation review interface may also present hypernyms defined in the ontology that do not appear in any annotations of the set of annotation also for review by the user.

As an example, a first version of an ontology may include the hypernym, "ENTERTAINMENT," which is used to annotate the text sample, "movie on this flight," as "[ENTERTAINMENT] movie [/] on this flight." A subsequent version of the ontology, however, may remove the hypernym, "ENTERTAINMENT," thus making any annotations that include this hypernym obsolete. The quality assurance module may flag such annotations during the ontology consistency quality assurance check for presentation to the user at the annotation review interface. Upon review the user may, if desired, remove the annotation tagged with the obsolete hypernym.

As another example, a first version of the ontology may define the following semantic relationship, "LOCATION"→"ARRIVAL_LOCATION"→"AIRPORT," which is used to annotate the text sample, "fly to Boston," as "fly to [LOCATION] [ARRIVAL LOCATION] [AIRPORT] Boston [/] [/] [/]." A subsequent version of the ontology may revise the semantic relationship as "ARRIVAL_LOCATION"→"LOCATION"→"AIRPORT." As a result, the nested hierarchy of hypernym tags in the annotation (based on the previous semantic relationship) does not conform to the current semantic relationship defined in the current version of the ontology. The quality assurance module may thus flag the annotation during the ontology consistency quality assurance check for further review by the user at the annotation review interface.

The ontology consistency quality assurance check may also be utilized to ensure consistency between intentions and other concepts in an ontology. As an example, the text sample, "I want to check-in in business class," may be annotated as "[CHECK-IN] I wanted to check-in in [CLASS] business class [/] [/]" based on a relationship between the intention, "CHECK-IN," and the concept, "CLASS," in an ontology. If this relationship is subsequently modified or removed from that ontology, the ontology consistency quality assurance check would flag the annotation in this example for review.

Figure 13:
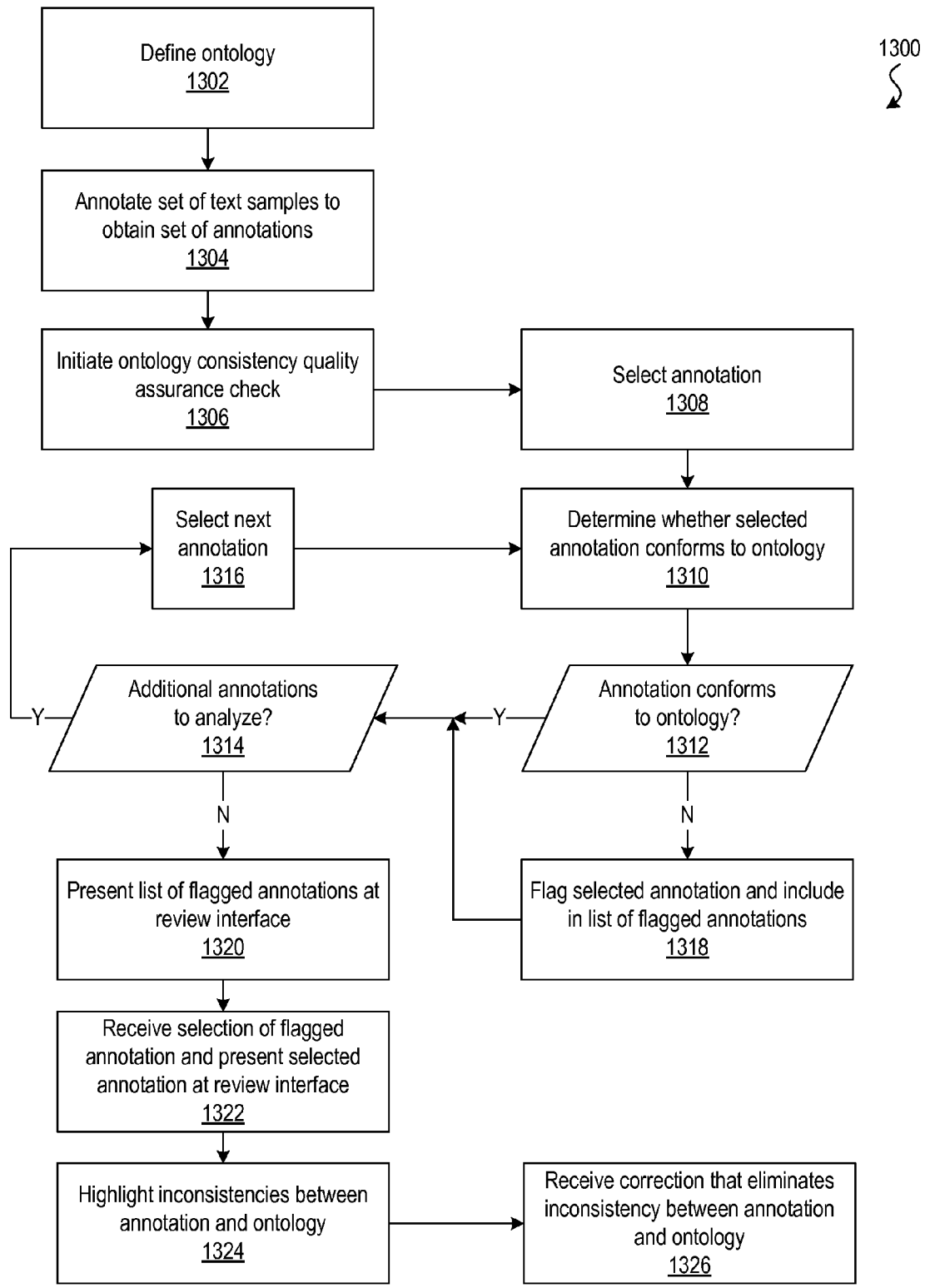
FIG. 13 is a flowchart of example method steps for performing a fifth type of quality assurance check according to illustrative aspects described herein.

FIG. 13 illustrates a flowchart 1300 of example method steps for performing an ontology consistency quality assurance check. A user may define an ontology (block 1302) and annotate a set of text samples to obtain a set of annotations (block 1304) as described above. The ontology consistency quality assurance check may then be initiated (block 1306), e.g., manually by the user or automatically by the quality assurance module. The quality assurance module may select an annotation from the set of annotations (block 1308) and determine whether the selected annotation conforms to the current version of the ontology (block 1310). As described above, determining whether the selected annotation conforms to the ontology may include one or more of determining whether the hypernyms included in the annotation are defined in the ontology and whether a nested hierarchy of hypernym tags matches the defined semantic relationships between the hypernyms in the ontology.

If the selected annotation conforms to the ontology (block 1312:Y), then the selected annotation need not be flagged, and the quality assurance module may determine whether additional annotations remain to be analyzed (block 1314). If additional annotations remain to be analyzed (block 1314:Y), then the quality assurance module may select the next annotation (block 1316) and repeat these steps for the next selected annotation. If, however, the selected annotation does not conform to the ontology (block 1312:N), then the quality assurance module may flag the selected annotation and include the selected annotation in a list of flagged annotations (block 1318). The quality assurance module may then determine if additional annotations remain to be analyzed and, if so, repeat these steps for the next selected annotation. When no additional annotations remain to be analyzed (block 1314:N), the quality assurance module may provide the list of flagged annotations to the annotation review interface for presentation to the user (block 1320). The annotation review interface may receive a selection of one of the flagged annotations and present the flagged annotation selected (block 1322). The annotation review interface may also highlight the inconsistencies between the ontology and the flagged annotation selected (block 1324). Upon review of the flagged annotation selected, the user may correct the annotation at the annotation interface, e.g., to replace an obsolete hypernym or to revise a nested hierarchy of hypernym tags such that the annotation conforms to the current version of the ontology. The user may also delete the annotation and corresponding text sample if the text sample is no longer relevant to the current version of the ontology. The ontology consistency quality assurance check may be performed each time revisions are made to the ontology to ensure the set of annotations always corresponds to the most recent version of the ontology.

Another type of quality assurance check provided by the quality assurance module described herein may identify potential annotations that are missing for a text sample. This other quality assurance check may identify text samples having the same n-gram. If the n-gram is annotated in one of the text samples, but not the other text samples, then the text samples lacking the annotation may be flagged for review. The annotation review interface may identify the n-gram common among the text samples and highlight or otherwise indicate which text samples that n-gram is annotated in and which text samples the n-gram is not annotated in. The annotation review interface may include an option to automatically add the annotation to the text samples that do not include the annotation or an option to automatically remove the annotation from the text samples that do include the annotation. As an example the text samples, "Is flight number 960 on time?" and "Is my flight on time?" each include the n-gram, "on time." An annotation process may generate the following respective annotations for these text samples: "Is flight number 960 [FLIGHT_INFO] on time [/]?" and "Is [FLYER_INFO] my [/] flight on time?" As seen in this example, the latter annotation lacks the tag, [FLIGHT_INFO] even though it includes the same n-gram, "on time," as the former annotation. Accordingly this additional quality assurance check may flag these example annotations for review by a user.

As described above, the quality assurance checks improve the annotation corpus resulting from the annotation process. Data-driven NLU engines may infer grammars based on the annotation corpus, and the inferred grammars may be enhanced due to the improved annotation corpus. Techniques for inferring grammars from an annotation corpus are described in commonly-owned U.S. patent application Ser. No. 13/841,873 entitled "Ontology and Annotation Driven Grammar Interface" and filed on Jul. 15, 2013, which is incorporated by reference. The statistical models of data-driven NLU engines may likewise be enhanced due to the improved annotation corpus as also described above.

Speech applications may be configured to include such enhanced NLU engines for natural language processing. A speech application may be configured to include the grammar such that the speech application may parse text corresponding to received speech audio using the grammar. The speech application may receive speech audio from an individual via an audio input device such as a microphone. The speech application may obtain an electronic representation of the speech audio, e.g., an audio file. The speech application may then transform the audio file into a text file using a speech recognition module. The speech application may then parse and annotate the text file using the grammar during lexical analysis of the text file. As shown above, one example of a speech application may be a speech application for making airline reservations based on speech audio received from an individual regarding a desired departure location, arrival location, and departure date. It will be appreciated, however, that speech applications may be developed as described above for additional and alternative activities and endeavors.

Figure 14:
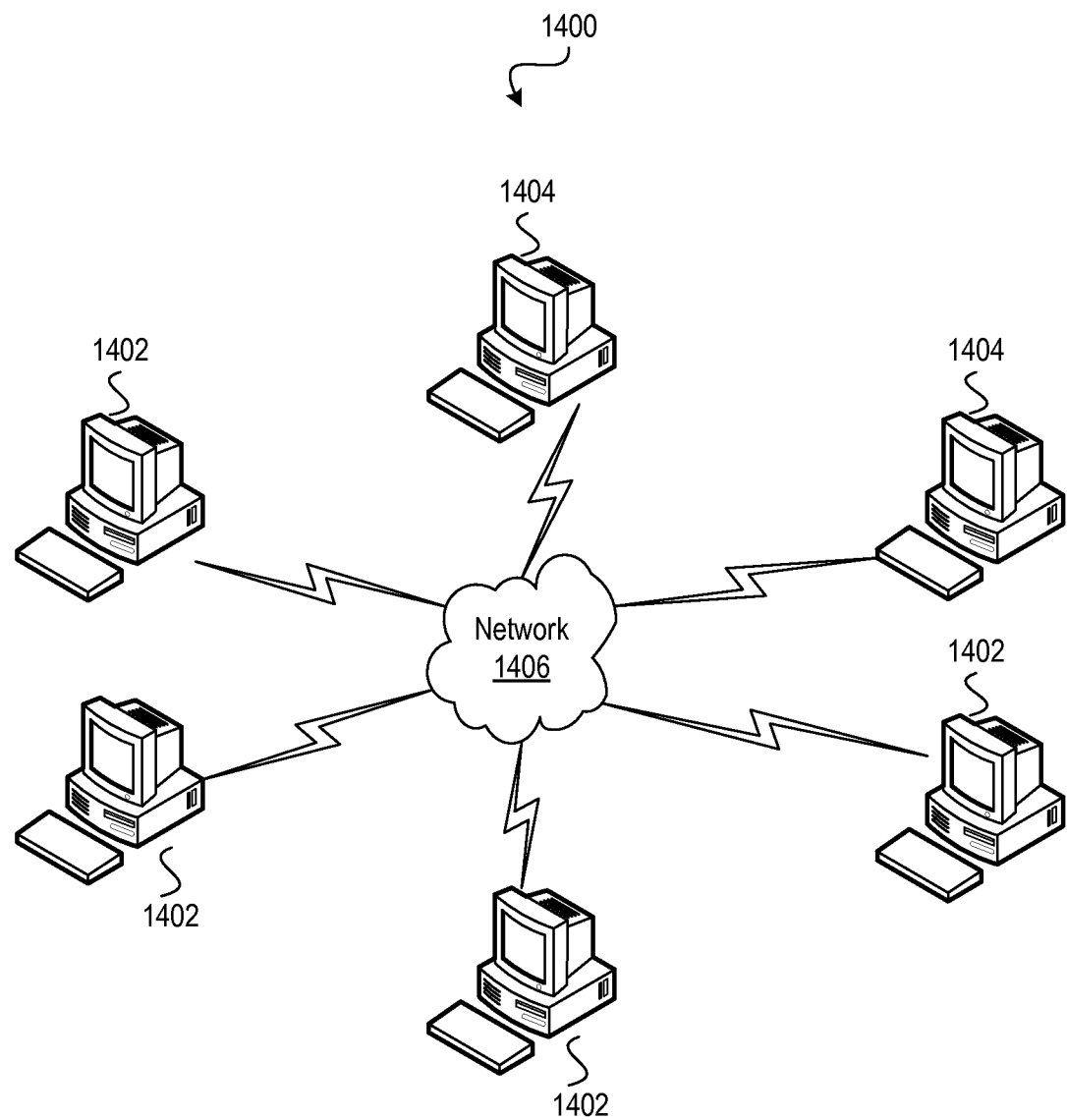
FIG. 14 is an example of an implementation of a computing environment in which aspects of the present disclosure may be implemented according to illustrative aspects described herein.

In FIG. 14, an example of an implementation of a computing environment 1400 in which aspects of the present disclosure may be implemented is shown. Client computing devices 1402 and server computing devices 1404 provide processing, storage, and input/output devices executing application programs and the like. Client computing devices 1402 may include, e.g., desktop computers, laptop computers, tablet computers, palmtop computers, smartphones, smart televisions, and the like. Client computing devices 1402 can also be linked through communications network 1406 to other computing devices, including other client devices computing devices 1402 and server computing devices 1404. Communications network 1406 can be part of a remote access network, a global network (e.g., the Internet), a cellular network, a worldwide collection of computers, local area or wide area networks, and gateways that currently use respective protocols (TCP/IP, Bluetooth, etc.) to communicate with one another. Other electronic device/computer network architectures are suitable.

Figure 15:
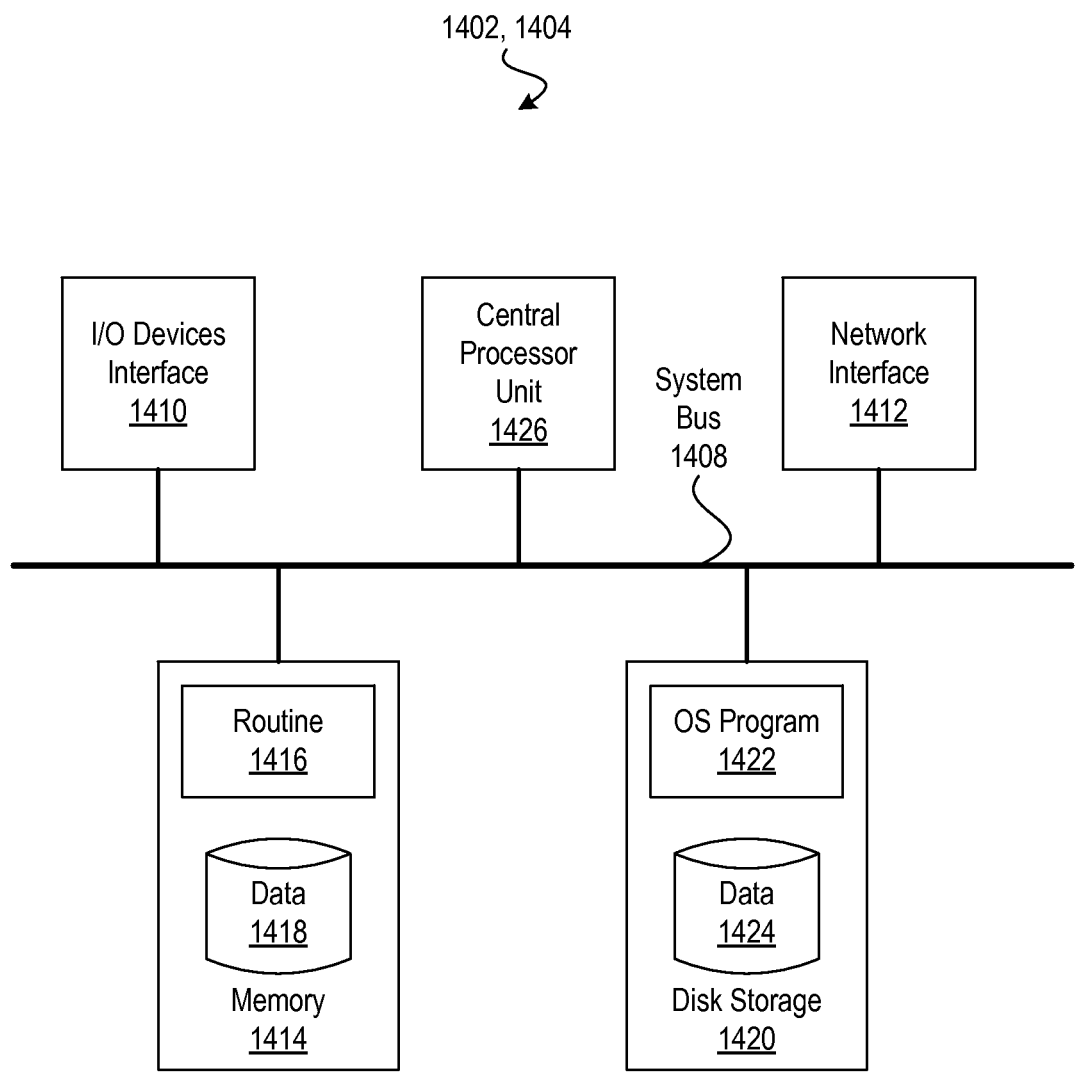
FIG. 15 is a block diagram of one of the computing devices of the computing environment of FIG. 14 according to illustrative aspects described herein.

In FIG. 15, a block diagram of one of the computing devices 1402 or 1404 of the computing environment 1400 of FIG. 14 is shown. The computing device 1402 or 1404 contains system bus 1408, where a bus is a set of hardware lines used for data transfer among the components of a computing device or processing system. Bus 1408 is essentially a shared conduit that connects different elements of a computing device (e.g., processor, disk storage, memory, input/output ports, network ports, etc.) that enables the transfer of information between the elements. Attached to system bus 1408 is I/O device interface 1410 for connecting various input and output devices (e.g., keyboard, mouse, displays, printers, speakers, etc.) to the computing device 1402 or 1404. Network interface 1412 allows the computing device to connect to various other devices attached to a network (e.g., network 1406 of FIG. 14). Memory 1414 provides volatile storage for computer software instructions 1416 and data 1418 used to implement aspects described herein (e.g., a recommendation engine implementing the steps detailed above). Disk storage 1420 provides non-volatile storage for computer software instructions 1422 and data 1424 used to implement various aspects of the present disclosure. Central processor unit 1426 is also attached to system bus 1408 and provides for the execution of computer instructions.

In one embodiment, the processor routines 1416 and 1422 as well as data 1418 and 1424 are a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. The computer program product can be installed by any suitable software installation procedure, as is well known in the art. At least a portion of the software instructions may also be downloaded over a cable, communication and/or wireless connection. Computer-readable media include all computer-readable media but do not include transitory propagating signals.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

While aspects have been particularly shown and described with references to example embodiments thereof, it will be understood that various changes in form and details may be made therein without departing from the scope and spirit identified by the appended claims.

What is claimed is:

1. A computer-implemented method for improving text annotation comprising:
configuring a grammar and an ontology used for natural language understanding (NLU) processing by:
obtaining, by a computing device, a plurality of annotations using the ontology and the grammar, each of the plurality of annotations corresponding to one of a plurality of text samples;
performing, by the computing device, one or more quality assurance checks for at least one of the plurality of annotations, the ontology, or the grammar;
generating, by the computing device, a list of one or more flagged annotations, each of the one or more flagged annotations corresponding to one of the plurality of annotations flagged during one of the one or more quality assurance checks;
presenting, at a display device of the computing device, the list of flagged annotations;
receiving, via a user input device of the computing device, user input modifying one of the one or more flagged annotations to obtain a modified annotation; and
updating at least one of the grammar or the ontology based on the modified annotation; and
wherein performance of the first one of the quality assurance checks comprises:
comparing a first arrangement of a set of hypernyms in a first annotation of the plurality of annotations to a second arrangement of the set of hypernyms in a second annotation of the plurality of annotations; and
configuring the list of flagged annotations to include the first annotation and the second annotation responsive to determine that the first arrangement of the set of hypernyms does not match the second arrangement of the set of hypernyms.

2. The method of claim 1 further comprising:
grouping, by the computing device, the list of flagged annotations by type of quality assurance check.

3. The method of claim 1 wherein performance of a second one of the quality assurance checks comprises:
obtaining a group of text samples comprising a first text sample corresponding lo a first annotation of the plurality of annotations and a second text sample corresponding to a second annotation of the plurality of annotations;
comparing a first hypernym of the first annotation to a second hypernym of the second annotation; and
configuring the list of flagged annotations to include the first annotation and the second annotation responsive to determining that the first hypernym differs from the second hypernym.

4. The method of claim 3 wherein grouping the plurality of text samples includes:
applying semantic clustering techniques to the set of text samples to obtain the group of text samples.

5. The method of claim 3 further comprising:
receiving user input corresponding to a selection of a hypernym selected for the group of text samples; and
updating each annotation of a group of annotations for the group of text samples to include the hypernym selected.

6. The method of claim 1 wherein performance of a second one of the quality assurance checks comprises:
determining whether multiple grammar rules of the grammar parse an n-gram; and
configuring the list of flagged annotations to include an annotation of the plurality of annotations corresponding to a text sample that includes the n-gram.

7. The method of claim 1 wherein performance of a second one of the quality assurance checks comprises:
determining whether the grammar is an acyclic grammar; and
responsive to determining that the grammar is not an acyclic grammar, configuring the list of flagged annotations to include one of the plurality of annotations that is associated with a cycle of the grammar.

8. The method of claim 1 wherein performance of a second one of the quality assurance checks comprises:
determining whether one of the plurality of annotations is consistent with the ontology; and
configuring the list of flagged annotations to include one of the plurality of annotations determined to be inconsistent with the ontology.

9. The method of claim 8 wherein determining whether one of the plurality of annotations is inconsistent with the ontology comprises at least one of:
determining the annotation includes a hypernym that is not defined in the ontology; and
determining that the annotation includes a nested hierarchy of hypernym tags that does not conform to a relationship defined in the ontology.

10. The method of claim 1 further comprising performing the one or more quality assurance checks in response to an update of the ontology.

11. An annotation system comprising:
at least one processor unit;
a display device;
a user input device; and
memory storing instructions that, when executed by the at least one processor, cause the annotation system to:
configure a grammar and an ontology used for natural language understanding (NLU) processing by:
obtaining plurality of annotations using the ontology and the grammar, each of the plurality of annotations corresponding to one of a plurality of text samples;
performing, by the computing device, one or more quality assurance checks for at least one of the plurality of annotations, the ontology, or the grammar;
generating, by the computing device, a list of one or more flagged annotations, each of the one or more flagged annotations corresponding to one of the plurality of annotations flagged during one of the one or more quality assurance checks;
presenting, at a display device of the computing device, the list of flagged annotations;
receiving, via a user input device of the computing device, user input modifying one of the one or more flagged annotations to obtain a modified annotation; and
updating at least one of the grammar or the ontology based on the modified annotation; and during performance of the first one of the quality assurance checks:
compare a first arrangement of a set of hypernyms in a first annotation of the plurality of annotations to a second arrangement of the set of hypernyms in a second annotation of the plurality of annotations; and
configure the list of flagged annotations to include the first annotation and the second annotation responsive to determine that the first arrangement of the set of hypernyms does not match the second arrangement of the set of hypernyms.

12. The annotation system of claim 11 wherein the instructions, when executed by the at least one processor, further cause the annotation system to group the list of flagged annotations by type of quality assurance check.

13. The annotation system of claim 11 wherein the instructions, when executed by the at least one processor during performance of a second one of the quality assurance checks, cause the annotation system to:
obtain a group of text samples using semantic clustering techniques, the group of text samples comprising a first text sample corresponding to a first annotation of the plurality of annotations and a second text sample corresponding to a second annotation of the plurality of annotations;
compare a first hypernym of the first annotation to a second hypernym of the second annotation; and
configure the list of flagged annotations to include the first annotation and the second annotation responsive to determining that the first hypernym differs from the second hypernym.

14. The annotation system of claim 13 wherein the instructions, when executed by the at least one processor during performance of the second quality assurance check, further cause the annotation system to:
receive, via the user input device, user input selecting a hypernym for the group of text samples; and
update the first annotation and the second annotation of the group of text samples to include the hypernym selected.

15. The annotation system of claim 11 wherein the instructions, when executed by the at least one processor during performance of a second one of the quality assurance checks, cause the annotation system to:
determine whether multiple grammar rules of the grammar parse an n-gram; and
configure the list of flagged annotations to include an annotation of the plurality of annotations corresponding to a text sample that includes the n-gram.

16. The annotation system of claim 11 wherein the instructions, when executed by the at least one processor during performance of a second one of the quality assurance checks, cause the annotation system to:
determine whether the grammar is an acyclic grammar; and
responsive to determining that the grammar is not an acyclic grammar, configure the list of flagged annotations to include one of the plurality of annotations that is associated with a cycle of the grammar.

17. The annotation system of claim 11 wherein the instructions, when executed by the at least one processor during performance of a second one of the quality assurance checks, cause the annotation system to:
compare, to the ontology, a hypernym included m an annotation of the plurality of annotations; and
configure the list of flagged annotations to include the annotation responsive to determining the hypernym is not defined in the ontology.

* * * * *